Aug. 8, 1967  W. D. CAWLEY  3,334,551
MACHINE FOR MAKING BAGS
Filed Oct. 1, 1964  14 Sheets-Sheet 1

INVENTOR.
Wesley Don Cawley
BY
Greist, Lockwood, Greenawalt & Dewey
attys

Aug. 8, 1967

W. D. CAWLEY 3,334,551

MACHINE FOR MAKING BAGS

Filed Oct. 1, 1964

INVENTOR.
Wesley Don Cawley,
BY
Grist, Lockwood, Greenawalt & Dewey
ATTYS

Aug. 8, 1967 W. D. CAWLEY 3,334,551
MACHINE FOR MAKING BAGS
Filed Oct. 1, 1964 14 Sheets-Sheet 6

Fig. 6

INVENTOR.
Wesley Don Cawley,
BY
Teare, Lockwood, Grunawalt & Drury
attys

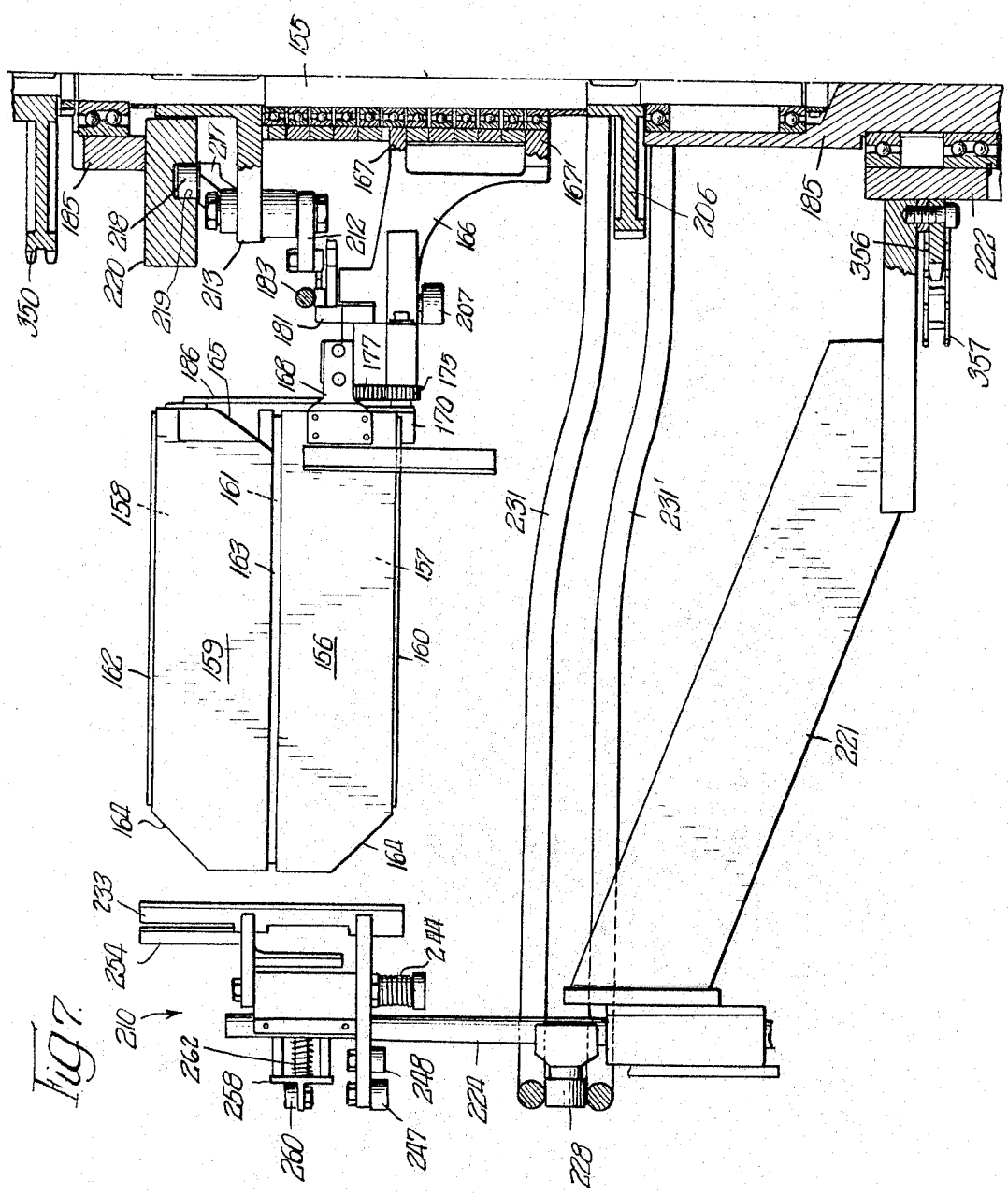

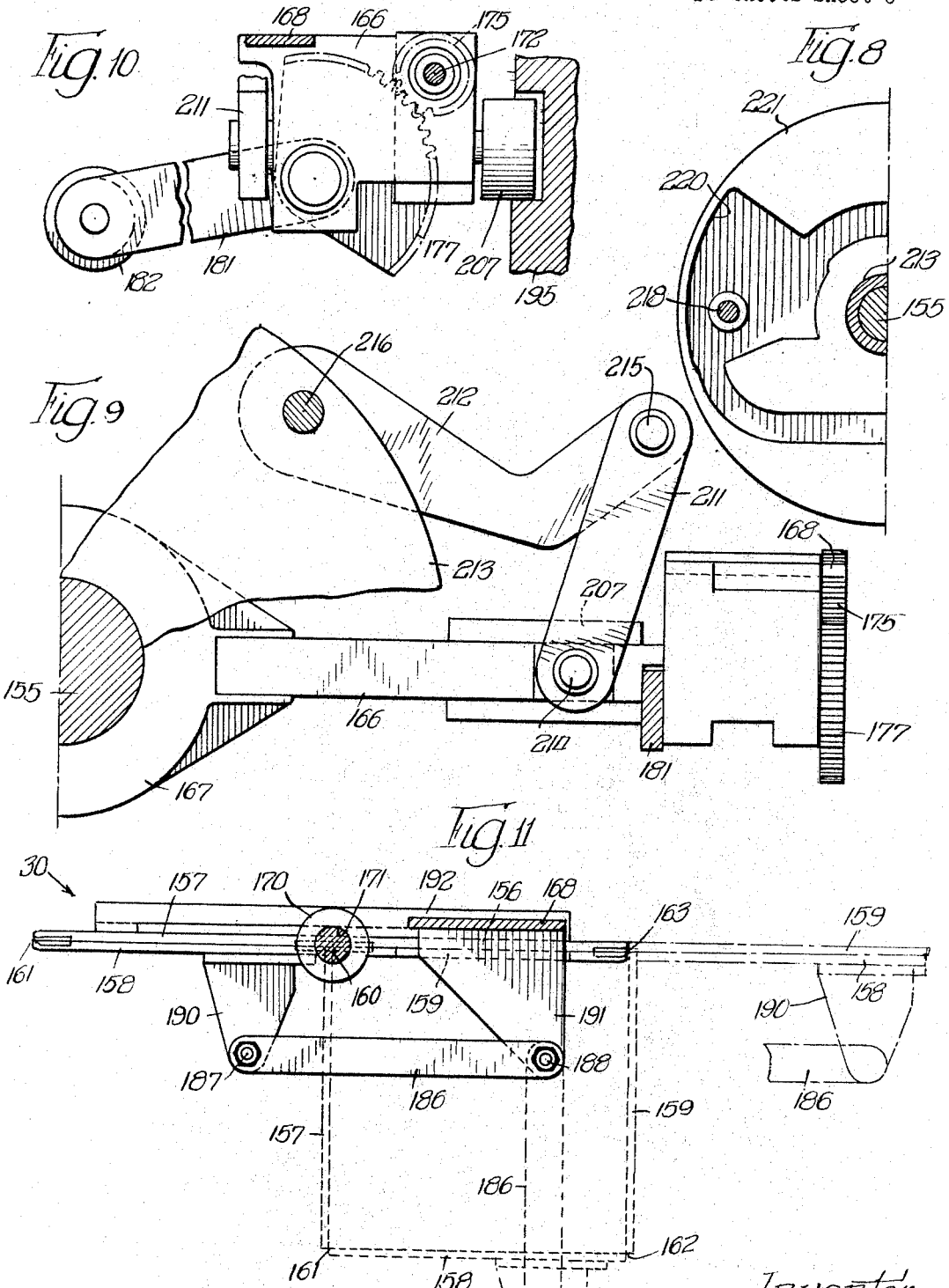

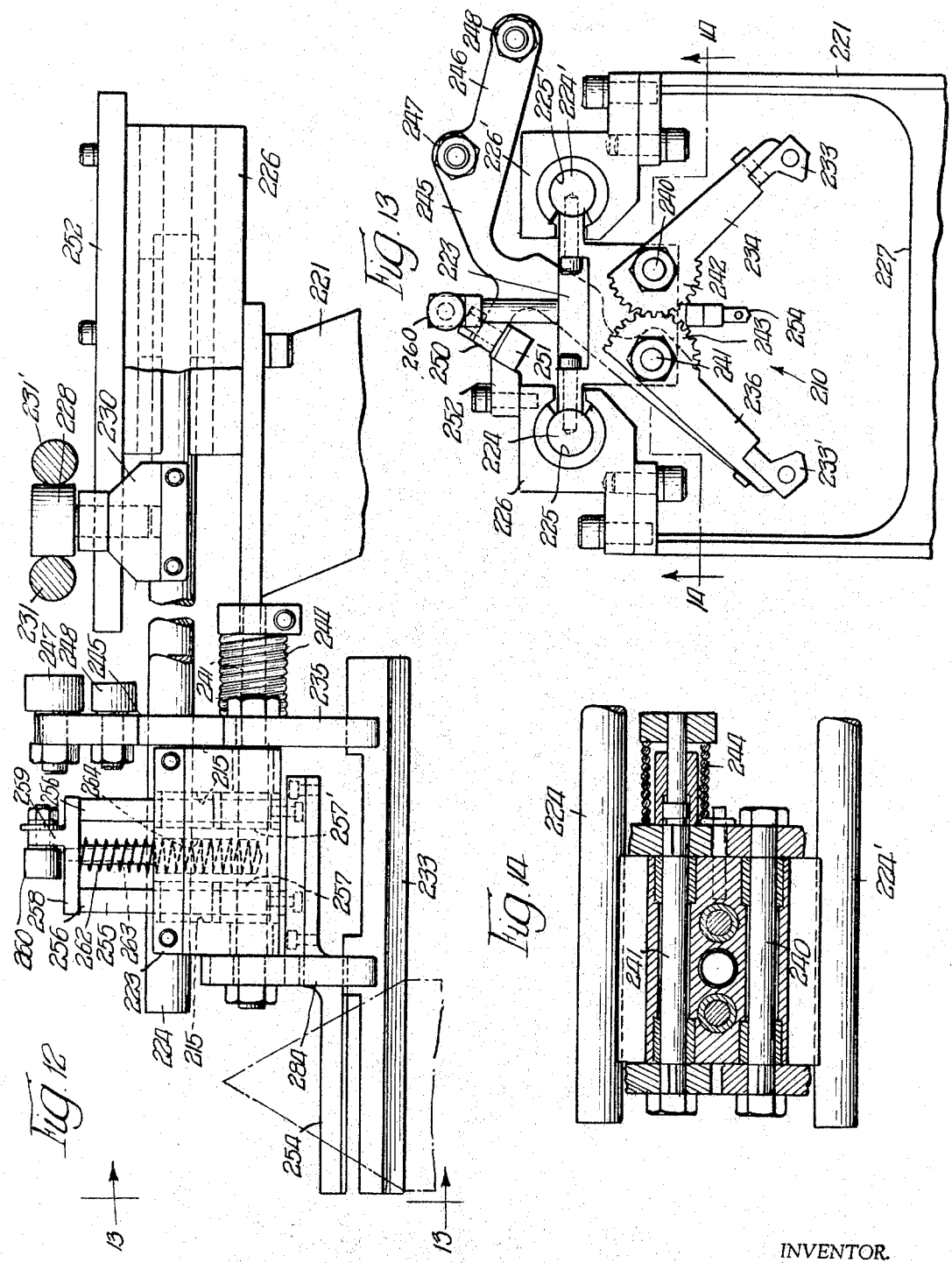

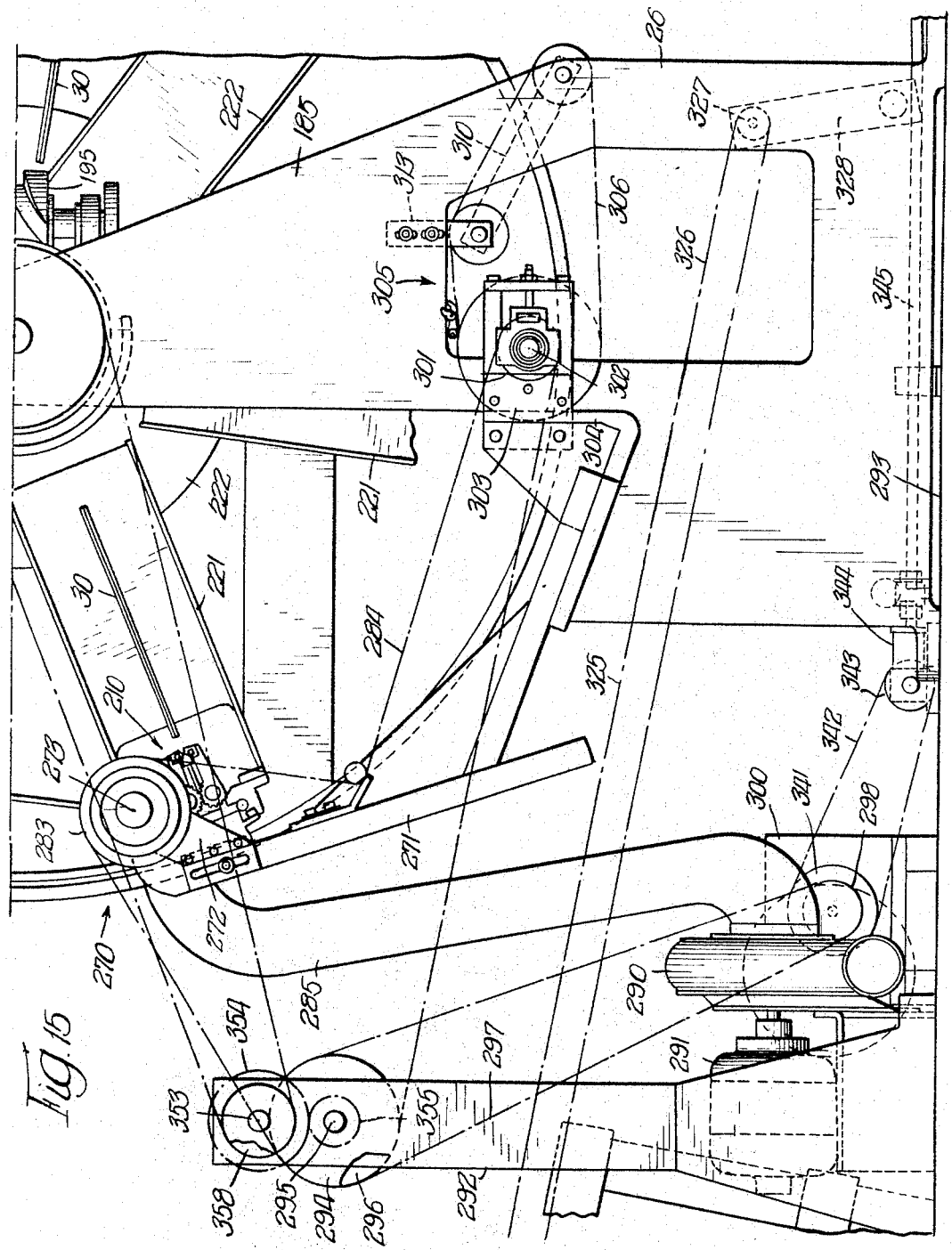

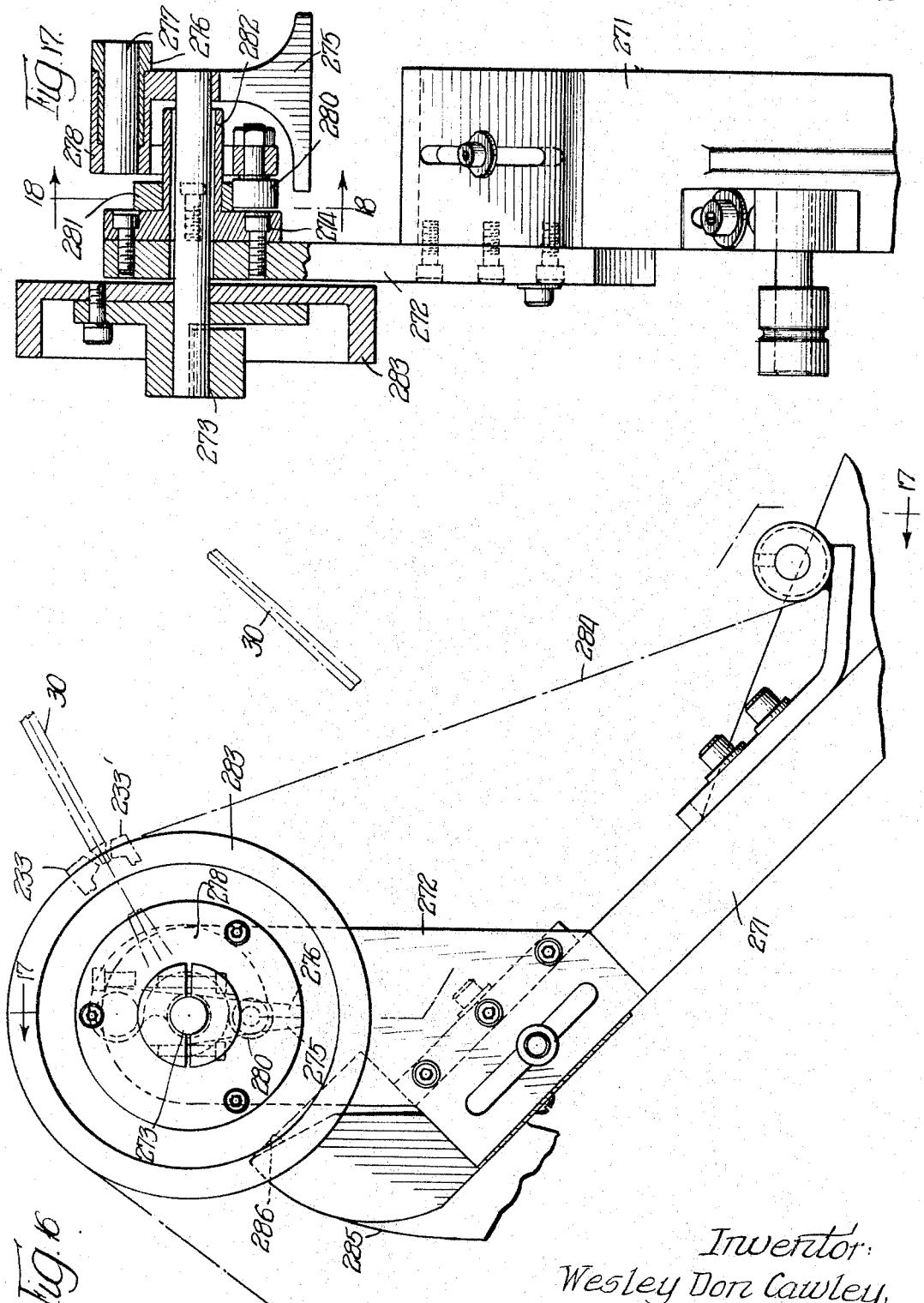

Aug. 8, 1967  W. D. CAWLEY  3,334,551
MACHINE FOR MAKING BAGS
Filed Oct. 1, 1964  14 Sheets-Sheet 12
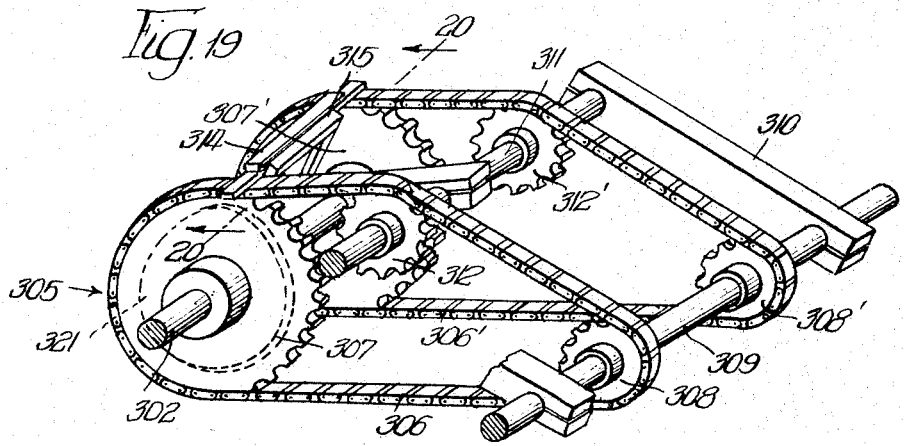
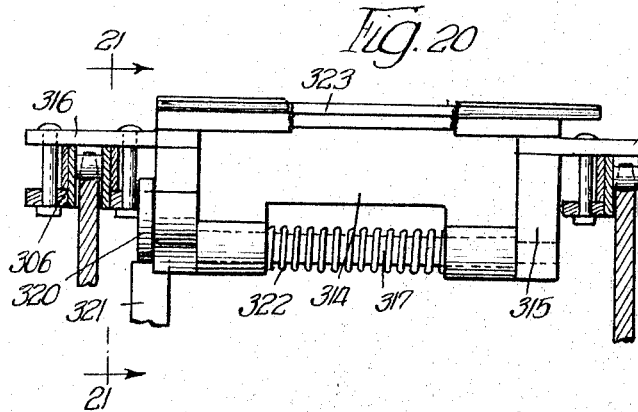
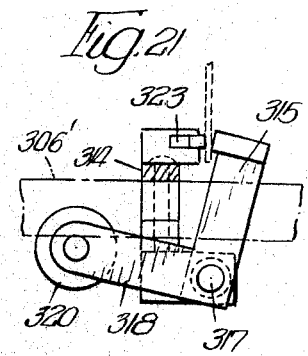
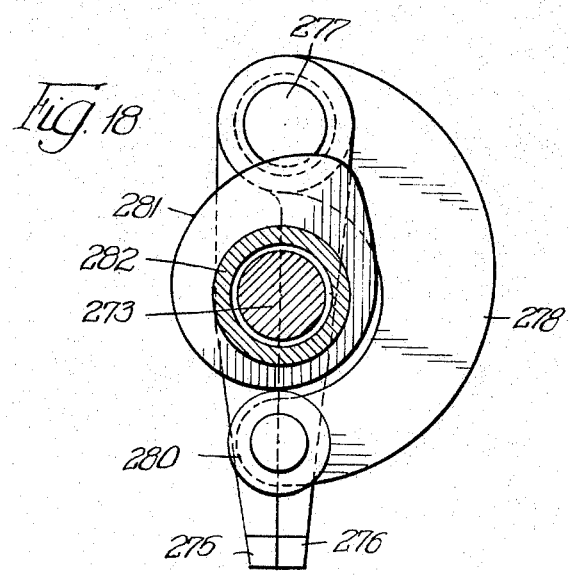
Inventor
Wesley Don Cawley,
Grist, Lockwood, Grunawalt & Drury
Attys

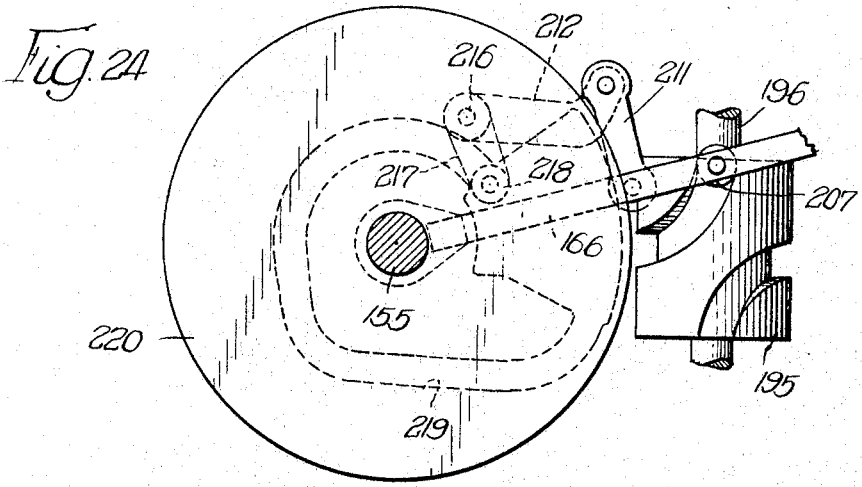
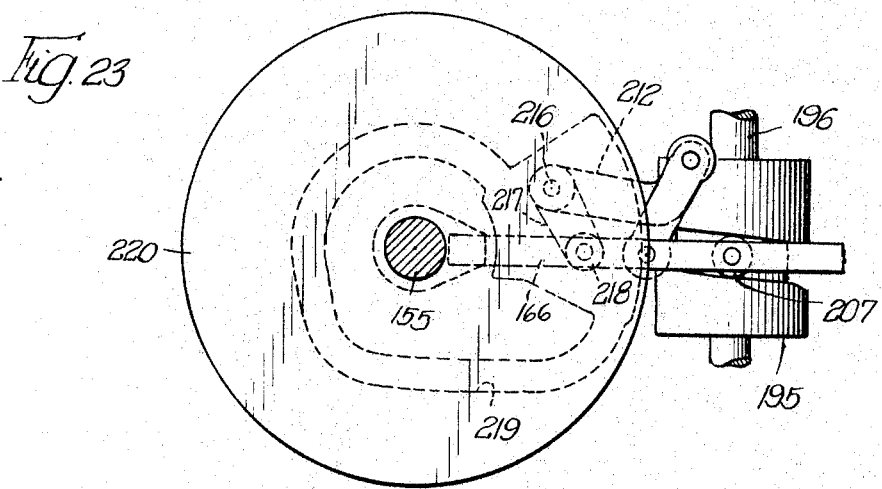
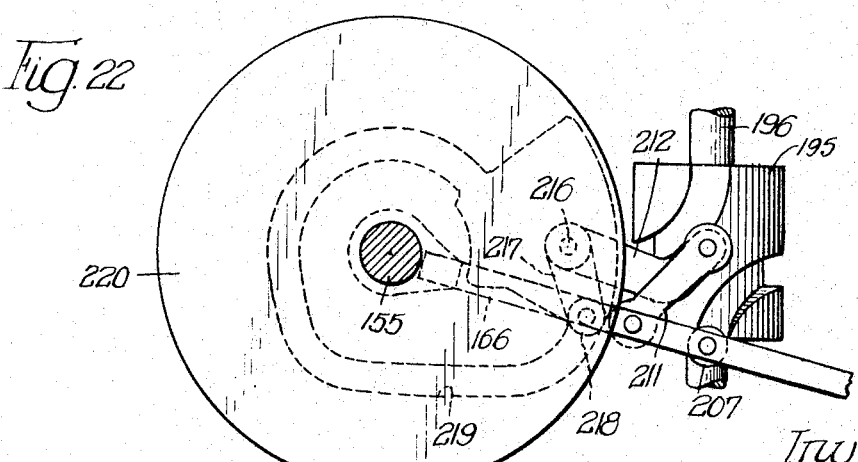

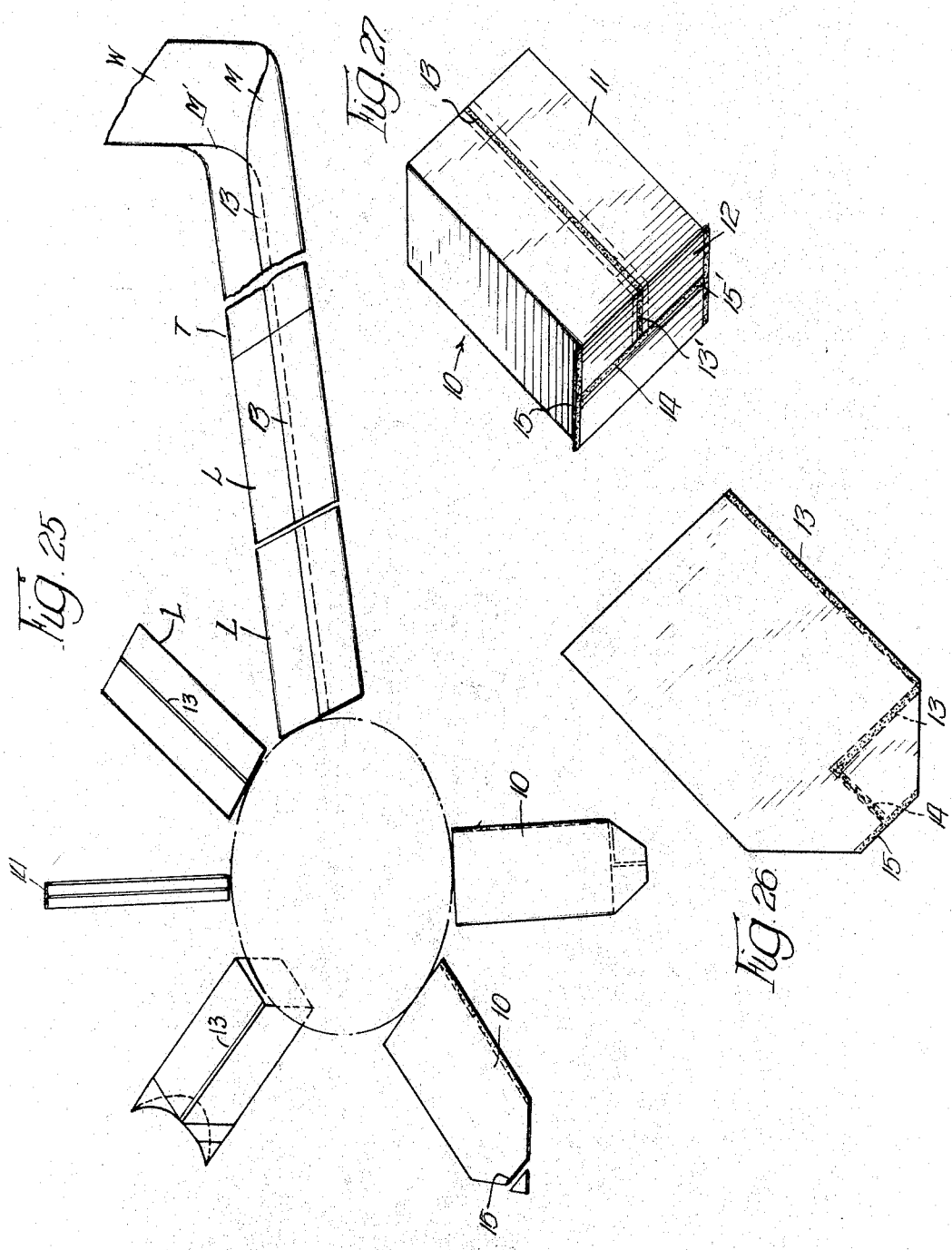

United States Patent Office 3,334,551
Patented Aug. 8, 1967

3,334,551
MACHINE FOR MAKING BAGS
Wesley Don Cawley, Oak Lawn, Ill., assignor to Continental Can Company, Inc., New York, N.Y., a corporation of New York
Filed Oct. 1, 1964, Ser. No. 400,721
33 Claims. (Cl. 93—8)

ABSTRACT OF THE DISCLOSURE

A bag fabricating machine which is characterized by apparatus for folding longitudinally a continuous web of film material and sealing overlapped margins to form a tube, transverse seal forming and severing apparatus operative to divide the tube into bag forming sections, apparatus for feeding successive bag sections onto collapsible plate mandrels carried on radial arms on a continuously rotating turret and having means for expanding the mandrels and opening up the bag sections as they are advanced, bottom sealing and trimming mechanisms carried on the turret which are operative on the squared-up sealed end of each successive bag section to form a square bottom thereon and trim away waste portions, and a stripper device operative after the mandrels are collapsed to strip the bags therefrom and deliver the same to a discharge conveyor.

---

This application has to do with packaging and is more particularly concerned with improvements in a machine for manufacturing bags from a flexible thermo-plastic film material.

It has been proposed heretofore to fabricate from a flexible plastic sheet material a tubular bag which has a bottom construction which is characterized by a rectangular outline or shape and which is commonly referred to as a "square bottom." One such bag and a method and apparatus for forming the same are disclosed in patent No. 3,150,573, granted September 29, 1964, to Thomas E. Piazze. In forming the bag disclosed therein a web or sheet of stock film material is initially folded into a flattened tube and a longitudinally extending seal is formed in the overlapped side margins of the material. The sealed tube is cut into bag forming sections or lengths and a transverse seal is applied which closes the trailing end of each bag section or cut tube length. Thereafter successive bag forming sections or lengths are telescoped over collapsed mandrels which are then opened up and additional seals are made in the bottom forming material so as to provide the bag with a so called "square bottom" construction and with the material which is outside the sealed areas being cut away. A general object of the present invention is to provide improvements in apparatus for fabricating a bag of the general type described in Patent No. 3,150,573.

A more specific object of the invention is to provide a machine for forming bags of flexible heat sealable plastic film material which comprises means for longitudinally folding a continuous web of the material into flattened tube formation, means for sealing the tube to provide a longitudinal seam therein, means for cutting the seamed tube into bag forming sections of predetermined length, means for delivering the bag lengths to hinged plate mandrels which are mounted on a rotating turret-like frame and which are in collapsed flattened condition, means associated with the rotating frame for transversely sealing the end of each bag section, means for hinging the mandrel plate through a tube forming position to a different collapsed and flattened position so as to first square up each bag section and form a body portion of square cross section and then collapse the same with triangular shaped bottom fold portions projecting at opposite sides or ends thereof, means for heat sealing across the triangular bottom fold portions along the edges of the bottom, means for removing triangular shaped waste portions thereof projecting outside of the edge seals thus formed and means for removing the completed bags in flattened condition from the mandrels for delivery from the machine.

A further object of the invention is to provide an apparatus for forming bags of flexible, heat sealable plastic film material which comprises mechanism for longitudinally folding a continuous web of the film material into a continuous flattened tube with side edge margins of the web overlapped and sealed to provide a longitudinal seam, mechanism for cutting the tube into bag forming lengths, mechanism for feeding the bag lengths successively to collapsed hinge plate mandrels mounted on a rotating turret, mechanisms associated with the turret for transversely sealing the bottom forming trailing end of each bag section, mechanism for hinging the mandrel plates and squaring up each bag section so as to first form a body portion of square cross section and then collapse the same so that projecting triangular shaped portions are formed at opposite sides of the bottom thereof, mechanism for heat sealing across the triangular portions along the edge folds of the bottom, mechanism for removing the triangular waste projecting outside of the edge seals thus formed, and mechanism for stripping the completed bags from the collapsed mandrels and delivering them from the machine.

Another object of the invention is to provide in a bag fabricating machine of the type described an improved mechanism for feeding successive bag forming lengths of flattened tubular bag material from a forming mandrel, upon which a continuous web of stock material is shaped, sealed into a tube, and cut into bag lengths to collapsed plate mandrels carried on a turret on which the tube material at one end of each bag forming length is sealed and shaped into a rectangular bottom formation.

These and other objects and advantages of the invention will be apparent from a consideration of the bag forming machine which is shown by way of illustration in the accompanying drawings wherein:

FIGURE 6 is a sectional view taken on the line 6—6 of FIGURE 5 to an enlarged scale;

FIGURE 7 is a sectional view taken on the line 7—7 of FIGURE 1 to an enlarged scale and with portions broken and other portions omitted;

FIGURE 8 is a fragmentary section taken on the line 8—8 of FIGURE 6;

FIGURE 9 is a fragmentary section taken on the line 9—9 of FIGURE 6 to an enlarged scale;

FIGURE 10 is a fragmentary section taken on the line 10—10 of FIGURE 6 to an enlarged scale;

FIGURE 11 is a section taken on line 11—11 of FIGURE 6 to an enlarged scale;

FIGURE 12 is a view taken on the line 12—12 of FIGURE 1, to an enlarged scale and with portions broken away, showing the bag bottom seal forming mechanism with the sealing irons in the open position;

FIGURE 13 is a front elevation of the sealing mechanism shown in FIGURE 12, the view being taken on the line 13—13 of FIGURE 12;

FIGURE 14 is a cross section taken on the line 14—14 of FIGURE 13;

FIGURE 15 is a fragmentary front side elevation, to an enlarged scale, showing particularly the apparatus for removing waste portions after the bottom sealing operation is completed;

FIGURE 16 is a fragmentary side elevation, to an enlarged scale, showing the apparatus for removing the waste material after the final sealing operation;

FIGURE 17 is a sectional view taken on the line 17—17 of FIGURE 16;

FIGURE 18 is a sectional view taken on the line 18—18 of FIGURE 17, to an enlarged scale;

FIGURE 19 is a fragmentary perspective view showing the apparatus for stripping the completed bag from the collapsed mandrel;

FIGURE 20 is a fragmentary sectional view taken on the line 20—20 of FIGURE 19;

FIGURE 21 is a sectional view taken on the line 21—21 of FIGURE 20;

FIGURE 22 is a fragmentary cross section, largely schematic, illustrating the cam and linkage control of the movement of the mandrel as it approaches the dwell point where a bag forming section of tubing is delivered to the mandrel;

FIGURE 23 is a view similar to FIGURE 22 with the mandrel at the dwell point;

FIGURE 24 is a view similar to FIGURE 22 with the mandrel advanced beyond the dwell point to its normal position relative to the supporting shaft;

FIGURE 25 is a perspective view, largely schematic and illustrating the principal steps of the method of fabricating bags as carried out by the machine;

FIGURE 26 is a perspective view, illustrating a finished bag, in collapsed condition, as delivered by the machine; and FIGURE 27 is a perspective view of the bag which is fabricated on the machine, the bag being shown in opened up condition ready for filling.

Figure 1:
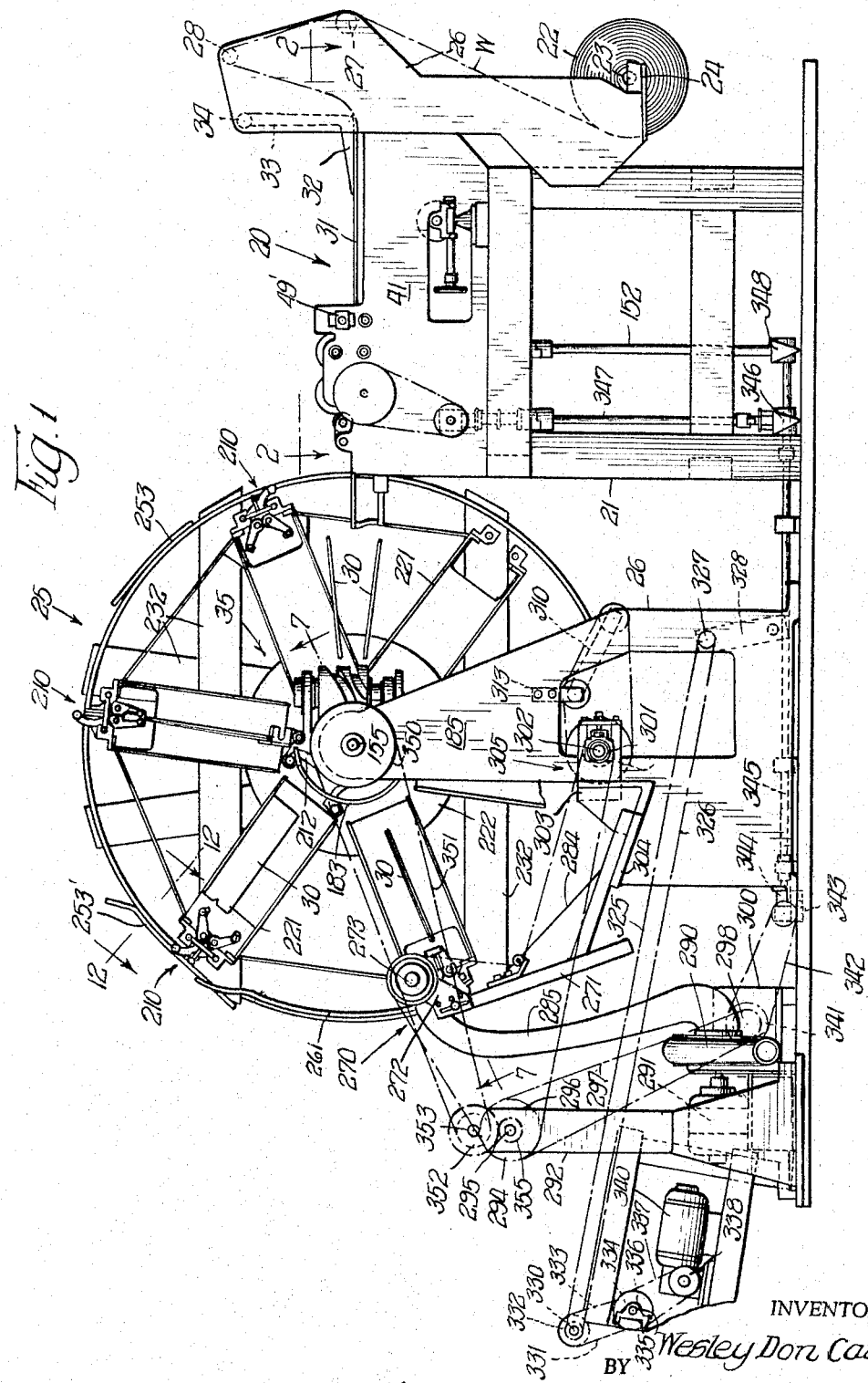
FIGURE 1 is a side elevation with portions broken away of a machine for fabricating a bag from flexible plastic film material which incorporates therein the principal features of the invention.

The machine which is illustrated in FIGURES 1 to 24, is adapted to fabricate the bag 10 which is illustrated in flattened, collapsed condition, as delivered by the machine, in FIGURE 26 and in opened up condition in FIGURE 27. The bag 10, in the open condition, comprises a tubular body 11 of rectangular cross section with a bottom structure 12 which has a rectangular shape. The tubular body 11 has a longitudinal seam 13 formed by overlapping and sealing the side margins of the stock material from which the bag is fabricated. The longitudinal seam 13 extends at 13' into the bottom structure 12 which is formed with a transverse or cross seam 14 and a pair of side edge seams 15 and 15'.

Figure 2:
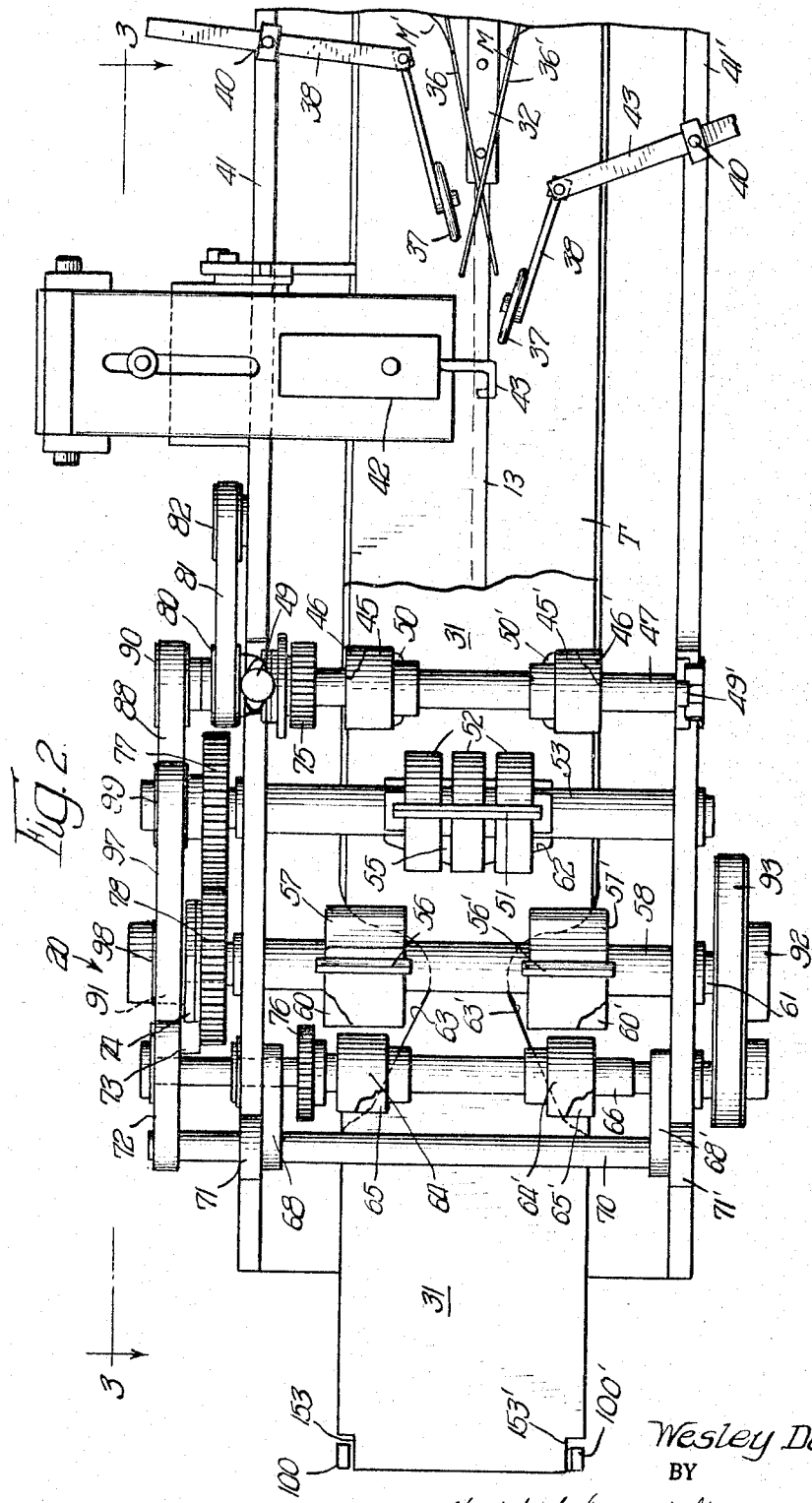
FIGURE 2 is a plan view, to an enlarged scale, of the tube forming portion of the machine, the view being taken on the line 2—2 of FIGURE 1.
Figure 3:
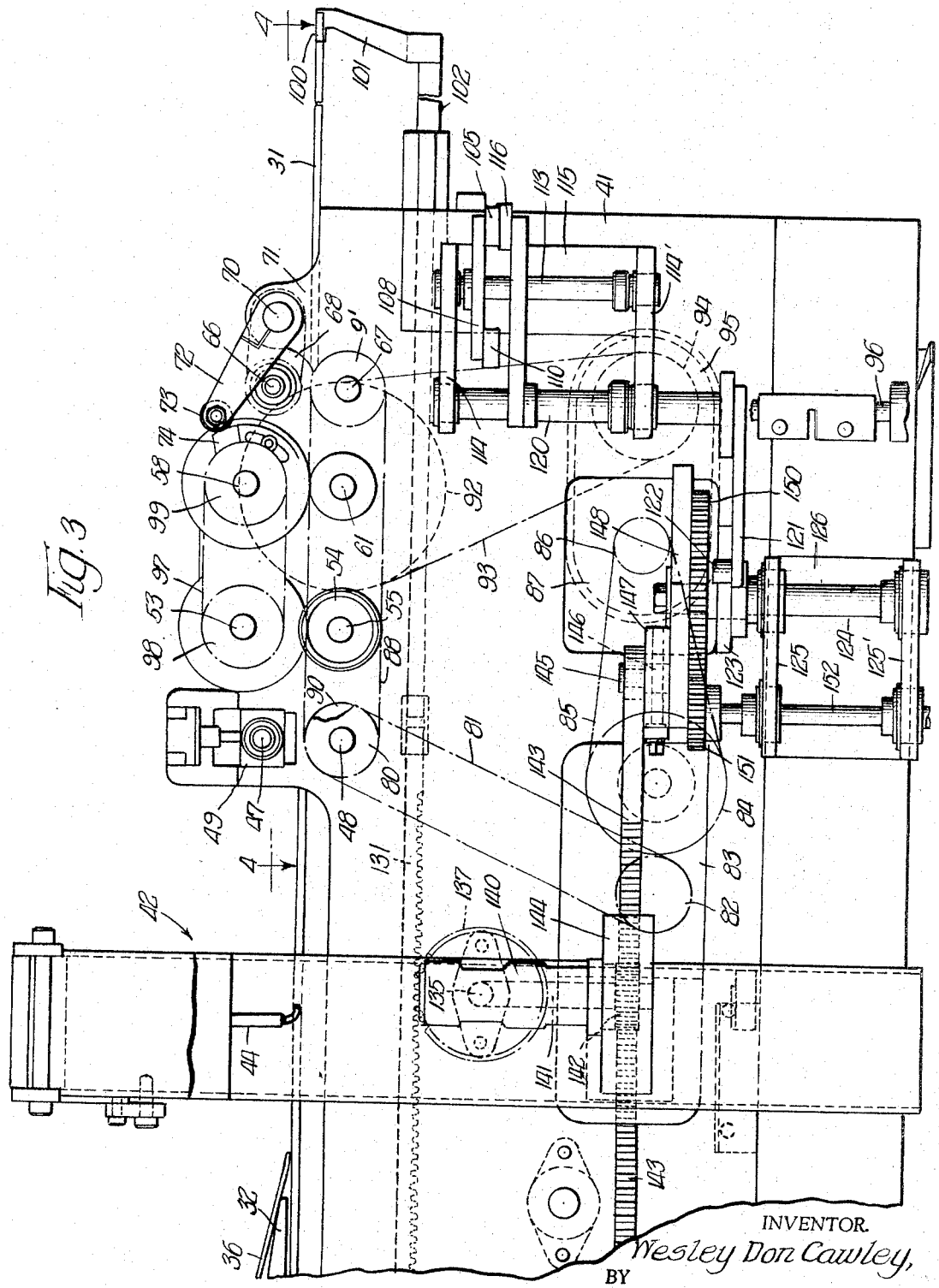
FIGURE 3 is a side elevation, to an enlarged scale, of the tube forming portion of the machine, the view being taken on the line 3—3 of FIGURE 2, and portions thereof being broken away.
Figure 4:
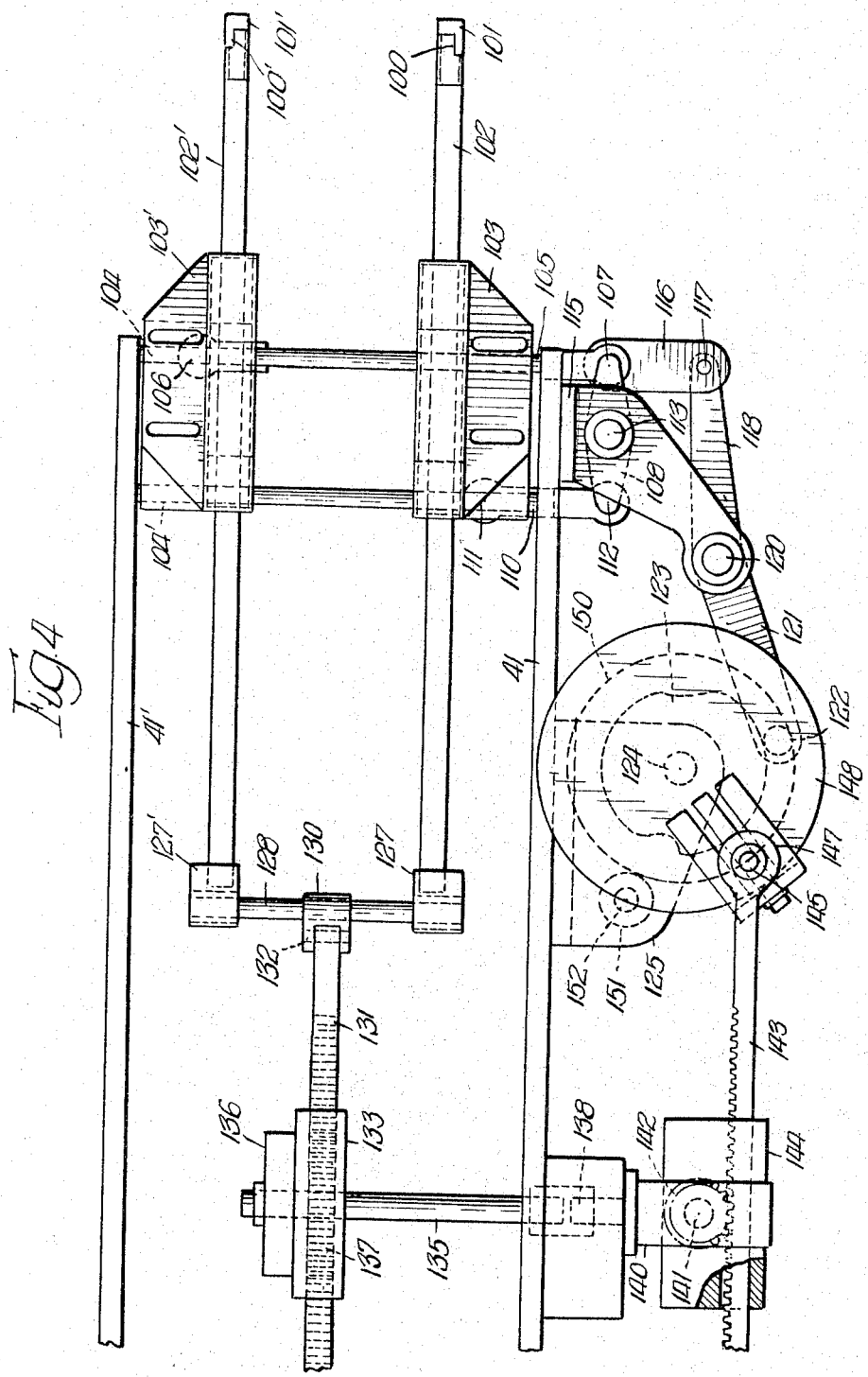
FIGURE 4 is a partial section taken on the line 4—4 of FIGURE 3.
Figure 5:
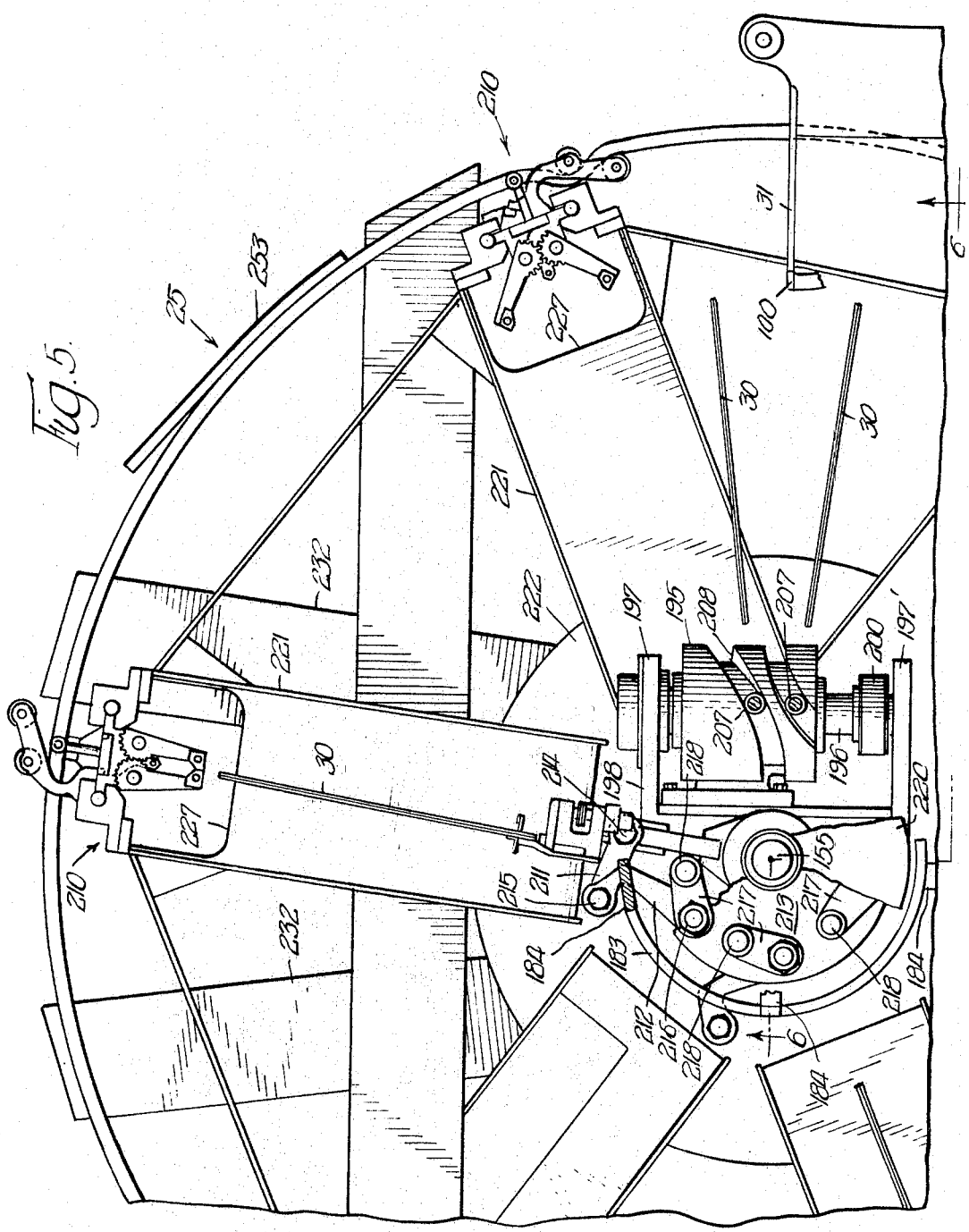
FIGURE 5 is a partial side elevation of the mandrel carrying turret and associated mechanisms with portions broken away, the view being on an enlarged scale.

The bag 10 is fabricated on the machine of the present invention by successive operations which are illustrated schematically in FIGURE 25 and which will be described briefly in order that the structure and operation of the machine may be more readily understood. The stock material in the form of a web W of a suitable heat sealable plastic film material, such as for example, polyethylene film, is first formed into a flattened tube T, a longitudinal seal or seam 13 is formed in overlapping side edge portions of the web W and the tube is cut into bag forming lengths or sections L on a tube forming sealing and cutting mechanism 20 (FIGURES 1 to 3). The successive bag forming lengths or sections L are delivered to a bottom forming mechanism 25 with each bag forming section L being advanced by a positive feed mechanism in telescoped relation onto a collapsed plate mandrel assembly 30 which is carried on a rotating turret 35. A transverse bottom end seam 14 is then formed at the trailing end of each flattened tube section L after which the bag body forming portion is squared up by opening up the plates of the mandrel assembly 30 with the material adjacent the end seam 14 being moved into a transverse plane at the free end of the mandrel assembly 30 and the end seam 14 extending across the center of the rectangular shaped bottom formation resulting from the squaring up of the body forming portion. The side or end seams 15 and 15' are then formed with the mandrel being collapsed by hinging the plates in a different direction to flatten the bag. The triangular waste forming portions extending outside the side or end seams 15 and 15' are removed and the flattened bag 10 (FIGURE 26) is stripped from the collapsed mandrel assembly 30 and delivered from the machine.

The machine, as illustrated in FIGURE 1, comprises two main mechanisms, a tube forming, sealing and cutting mechanism 20 and a bottom forming mechanism 25. The tube forming sealing and cutting mechanism 20 is supported on an upright generally rectangular frame 21 which also supports, on a subframe, a roll 22 of the stock material or film W from which the bags are made. The film supply roll 22 is carried on a shaft 23 which is supported at its ends on a pair of roller bearing support members 24 mounted in a suitable manner at the lower end of a subframe formed by a pair of vertically disposed, laterally spaced, side frame plates 26 which are secured on the end of the frame 21. The web is guided over vertically spaced idler rolls 27 and 28 which are mounted on shafts journaled in the vertical frame plates 26 and passes beneath the trailing end of a longitudinally extending horizontally disposed forming plate or mandrel 31. The tube forming mandrel plate 31 is mounted at its trailing end on a bracket 32 which is suspended by hanger 33 from a cross bar 34 extending between the top portions of the frame plates 26. The web W has its side margins M and M' overlapped on the top of the forming plate 31 by a pair of guide rods 36 and 36' (FIGURES 2 and 3) which are supported in any convenient manner on a fixed frame portion. The folded web W is held in tube forming relation on the forming plate 31 by a plurality of rubber tired discs 37 each of which is supported for free rotation on a bracket assembly 38 adjustably mounted at 40 on the top edges of laterally spaced upper side frame plates 41 and 41'.

A hot melt glue applicator device 42 of conventional construction, is mounted on a supporting frame 43 above the former plate 31 with a depending feed tube 44 which provides a line of hot melt adhesive between the overlapped margins M and M' of the web as the tube formation T advances on the forming plate 31. A pair of main draw rolls advance the tube T which are each formed in two sections 45, 45' and 46, 46' (FIGURES 2 and 3) mounted on parallel transverse shafts 47 and 48. The lowermost shaft 48 is journaled in the side frame members 41 and 41' while the uppermost shaft 47 is journaled in end bearing formations 49 and 49' which are mounted for vertical adjustment so as to enable the pressure between the rollers to be varied. The tube forming plate 31 is notched at 50 and 50' to accommodate the cooperating tube engaging roll sections 45, 46 and 45', 46'. The tube T is severed into bag forming lengths or sections L by two sets of cutting knives. A knife 51 for cutting across the center of the tube is mounted on supporting rolls 52 which are carried on an upper cross shaft 53, the latter being journaled in the side plates 41 and 41' above an anvil roller 54 which is carried on a lower cross shaft 55 also journaled in the side plates 41 and 41'. A pair of knives 56 and 56' for cutting the side marginal portions of the flattened tube in alignment with the cut in the center thereof are mounted on supporting rollers 57 and 57' carried on an upper cross shaft 58 above co-operating anvil rollers 60 and 60' which are carried on a lower cross shaft 61 also journaled in the side frame plates 41 and 41'. The former plate 31 is notched or slotted at 62 to accommodate the knife 51 and also at 63 and 63' to accommodate the knives 56 and 56'. The tube is held taut and advanced by a second set of draw rolls 64, 64' and 65, 65' which are mounted on parallel shafts and operated in the side marginal slots 63 and 63' in the former plate 31. The uppermost draw roll shaft 66 is journaled in the free ends of a pair of lever arms 68 and 68' extending radially from a rock shaft 70. The rock shaft 70 is journaled in bearing formations 71 and 71' upstanding from the top edges of frame plates 41 and 41' at the forward side of the frame 21. The rock shaft 70 is extended at one end and a lever arm 72 is secured thereon which carries at its free end a cam follower roller 73 adapted to engage a cam segment 74 on the cutting roll shaft 58 for a purpose which will be hereinafter described. The draw roll shafts 47 and 48 are connected by cooperating interengaging gears 75 and the shafts 66 and 67 are connected by cooperating interengaging gears 76. The cutting roll shafts 53, 55 and 58, 61 are connected in like manner by cooperating interengaging pairs of gears 77 and 78 so that the rotation of each pair of the shafts is synchronized.

The lowermost shaft 48 of the main draw roll assembly is extended at one side of the frame 21 and carries a pulley 80 which is connected by belt 81 with a pulley 82 on the output shaft of a register control device 83 which is governed by an electric eye (not shown) scanning the web W and operated by printed markings or indexing indicia on the web. The input shaft of the register control device 83 carries a pulley 84 which is connected by a drive belt 85 with an output pulley 86 on the output shaft of a variable speed drive 87, the latter being connected with the main power drive for the machine in a manner which will be hereinafter described.

The draw roll shaft 48 and the draw roll or forwarding roll shaft 67 are connected in driving relation by belt 88 and pulleys 90 and 91 on the shafts 48 and 67, respectively. The anvil shaft 61 carries a pulley 92 which is connected by a timing belt 93 with a pulley 94 on a right angle gear box 95 which is powered by a vertically disposed drive shaft 96 the latter having a driving connection with the variable speed drive 87. The two uppermost shafts 53 and 58 which carry the knife supporting rolls are connected by a drive belt 97 and pulleys 98 and 99 on the respective shafts.

A tube forwarding or feeding apparatus is associated with the tube forming apparatus 20 for advancing successive cut off sections L of the tube from the end of the former plate 31 and depositing the same on the mandrel assemblies 30 of the bag bottom forming apparatus 25. This apparatus is mounted on the frame 21 beneath the former plate 31. It comprises a pair of tube engaging finger members 100, 100' (FIGURES 2, 3 and 4) formed on the uppermost ends of brackets 101, 101' which are upstanding on the forward ends of a pair of parallel, longitudinally extending reciprocably mounted slide rods 102, 102'. The slide rods 102, 102' are supported for reciprocating movement longitudinally of the main supporting frame 21 in a pair of carriage forming members 103 and 103' which carriage members 103 and 103' are in turn supported for sliding movement transversely of the frame 21 on the parallel cross rods or bars 104 and 104' extending between the side frame plates 41 and 41'. A link bar 105 for moving the carriage 103 has one end pivoted at 106 to the carriage 103' and the other end pivoted at 107 to the one end of a rock lever 108. A parallel link bar 110 has one end pivoted at 111 to the carriage 103' and the other end pivoted at 112 to the opposite end of the rock lever 108. The rock lever 108 is mounted for pivotal movement intermediate its ends on a vertically disposed shaft 113 which is journaled in the vertically spaced arms 114 and 114' of a U-shaped mounting bracket 115 secured on the outside face of the frame side plate 41. A small link member 116 has one end pivoted at 107 to the rock lever 108 and the other end pivoted at 117 to the one end of lever arm 118 which is carried on the vertically disposed rock shaft 120 also journaled in the bracket arms 114 and 114'. The vertical shaft 120 is extended at its lower end and carries a cam follower arm 121 having on its free end a cam follower roller 122 which engages the track forming edge of a plate cam 123 mounted on the extended upper end of a vertically disposed shaft 124 which shaft 124 is journaled in the vertically spaced arms 125 and 125' of a U-shaped supporting bracket 126 mounted on the outside face of the frame side plate 41. Rotation of the vertical shaft 124 controls the relative lateral movement of the carriages 103 and 103' and thus the lateral movement of the finger supporting slide rods 102 and 102'. The slide rods 102 and 102' terminate at the ends opposite the fingers 100, 100' in bushing brackets 127 and 127' (FIGURE 4) having transverse bores which received in sliding relation the ends of a transversely extending pivot rod or rock shaft 128. The transverse shaft or rod 128 carries at its center a bracket 130 having a bifurated portion in which the end of an elongate rack 131 is secured by a cross pin 132. The rack 131 extends longitudinally of the frame 21 beneath the tube forming plate 31 and is supported in sliding relation in a bearing bracket 133, the latter being mounted on a fixed portion of the frame 21. A cross shaft 135 has one end supported in a suitable bearing 136 mounted on the bracket 133 and carries a pinion 137 (FIGURE 3) which engages with and drives the rack 131. The shaft 135 is journaled at the other end in the side frame plate 41 and is coupled at 138 to a right angle gear box assembly 140 (FIGURES 3 and 4) having on the lower end of the vertical shaft 141 a pinion 142 engaging with and driven by a rack 143 which is slidably mounted in the bearing bracket 144, the latter being fixed on the bottom end of the gear box assembly 140. The rack 143 is pivoted at 145 to a pivot block 146 which is slidable in a guide 147 on a crank disc 148. The crank disc 148 is mounted on the upper end of the shaft 124. A gear 150 on the shaft 124 is engaged by pinion 151 on a driven vertical shaft 152 which is journaled in the arms 125, 125' of the bracket 126. The shaft 152 extends from the gear box 348 and is rotated with a constant speed which imparts longitudinal and transverse movement to the tube engaging fingers 100 and 100'. The tube forming plate 31 has its forward corners notched out at 153 and 153' to permit the fingers 100 and 100' to enter the open end of each successive cut off tube section L as the leading end thereof is advanced to the end of the forming plate 31. The fingers 100 and 100' are operated to enter the end of the tube then spread outwardly or apart so as to engage within the tube end and grip the tube after which the slide rods 102 and 102' are moved forwardly to advance the tube section onto a mandrel assembly 30 which has been brought into position to receive the same. When the tube section is in telescoped position on the collapsed mandrel 30 the fingers 100 and 100' are moved toward each other a sufficient distance to release their grip on the tube section while their forward movement continues until the fingers are clear of the tube section. They are then moved laterally so as to clear the mandrel upon their return stroke in the direction of the tube forming plate 31 to pick up the next tube section L. As the fingers 100 and 100' are retracted they are also moved toward each other into proper alignment to enter the notches 153 and 153'.

The bag bottom forming or fabricating apparatus 25 (FIGURES 1, 5, 6 and 7) comprises the turret 35 supported on a transverse shaft 155 mounted on the upright supporting frame 26. Six plate mandrel assemblies 30 are carried on the transverse shaft 155, each of which comprises four generally rectangular plates 156, 157, 158 and 159 which are hingedly connected to each other at their long sides by hinges 160, 161, 162 and 163. The plate hinges are of a type which permits the plates to be brought into flattened or collapsed condition in two positions as shown in FIGURES 6 and 7. All four plates of each assembly 30 are notched or cut away at an outer corner so as to provide a tapered edge 164. In the one position, as shown in FIGURE 6, this results in a straight edge extending along the outer portions of the outer end of the mandrel with a center inwardly extending V-shaped notch defined by inwardly converging edges 164, while in the other collapsed position of the mandrel as shown in FIGURE 7, the diagonal edges 164 lie on the outside or outermost corners so that the end of the mandrel has a truncated triangular shape. One mandrel plate 158 is cut away at its inner end at 165 to provide clearance in manipulating the plates. Each mandrel assembly 30 is supported on the shaft 155 by means of an arm forming member 166 (FIGURES 6 and 9) having a bifurcated hub providing two spaced, bearing forming arm portions 167 and 167' which are in parallel planes and which receive in rotatable relation the supporting shaft 155. The one plate member 156 forms a base plate for each mandrel assembly 30 and is connected in fixed relation to the supporting arm 166 by means of a bracket member 168 (FIGURES 6, 7 and 9 to 11) extending from the inner end of plate 156 and bolted or otherwise secured to an outer end portion of the mounting or supporting arm 166. The plate 157 carries at its inner end a bracket plate member 170 having a socket forming bore 171 with its axis extending radially relative to the shaft 155 and opening in the direction of the shaft 155. The axis of the bore 171 is aligned with the axis of the hinge connection 160 between the plates 156 and 157 of the mandrel. The socket 171 receives in fixed relation therein the outer end of a pin 172 which extends into a bore 173 in the hub 174 of a toothed segment 175. The segment hub 174 is rotatably supported in suitable sleeve bearings in a radially extending bore 176 opening on the outer end of the arm 166. The segment 175 is in toothed engagement with a driving segment 177 on the end of a small shaft 178 which extends radially of the shaft 155 and which is journaled in bearings 179 in a bifurcated end portion 180 of the arm 166. The shaft 178 carries at its inner end an operating arm 181 having a cam roller 182 on the outer end thereof which is adapted to engage with a semicircular cam bar 183 (FIGURE 5) the latter being secured by means of angle brackets 184 to the upstanding bearing forming portion 185 (FIGURE 1) of the frame 26 at the front side of the machine. The mandrel plates 157 and 159 are connected by a link bar 186 (FIGURES 6, 7 and 11) which is pivotally connected at its opposite ends at 187 and 188 to the ends of angle brackets 190 and 191 which are secured to the inner ends of the plates 158 and 159, the latter being cut out or cut away to accommodate movement of the brackets 190 and 191 when the mandrel plates 158 and 159 are swung relative to each other from one position to the other. An angle bar 192 is attached at one end to the mandrel plate 156 adjacent the bracket 168 and extends across the hinge 160 and a portion of the mandrel plate 157 so as to form a stop for the latter when the plates are collapsed to the position shown in FIGURE 6. A torsion spring 193 on the shaft 178 urges the cam segment 177 in a direction to collapse the plate assembly to the position shown in FIGURE 6. In place of the torsion spring 193 a tension spring may be used for this purpose, one end of the tension spring being attached to the arm 181 and the other end to a linkage, hereinafter described, which connects each arm 166 with the shaft 155.

Each successive plate mandrel assembly 30 is brought to a temporary stop for loading as it moves into the plane of horizontal movement of the tube section L which is advanced from the discharge end of the tube forming mandrel plate 31. This movement of the mandrel assembly 30 is effected by a barrel cam 195 (FIGURES 5 and 6) mounted on a vertically disposed shaft 196 which is journaled in the parallel legs 197 and 197' of a U-shaped bracket 198 which is secured to a fixed part of the top frame portion 185. The shaft 196 carries a pulley 200 which is connected by a drive belt 201 (FIGURE 6) with a pulley 202 on a gear box 203, the latter being supported on a fixed portion of the frame 185. The gear box 203 has an input shaft 204 carrying a pinion 205 which is driven by a gear 206 keyed to the shaft 155. Each mandrel supporting arm 166 carries a cam follower roller 207 which is positioned to engage in a spiral cam track 208 in the barrel cam 195 when the arm 166 reaches a predetermined point in its rotative path. The cam track 208 is arranged to slow down the rotative movement of each successive mandrel assembly 30 as it approaches the position for receiving the bag forming length L of tubing from the former plate 31, to hold the mandrel assembly 30 stationary at the tube receiving position a sufficient length of time to receive the length of tubing L thereon and then, to advance the mandrel assembly 30 with the rotating main shaft 155 so as to bring the mandrel assembly into a radial position where it is properly aligned with a sealing mechanism 210 for forming the bottom seal. Each mandrel assembly 30 is connected to the shaft 155 by a linkage comprising the straight link bar 211 (FIGURES 5, 6 and 9), the L-shaped link bar 212 and the support plate 213, the latter being keyed to the shaft 155 so that it is fixed relative to the shaft 155 and rotates with the same. The link bar 211 is pivotally attached at 214 to the outer edge of a portion of mandrel support arm 166. At its other end the link bar is pivotally connected at 215 to the short leg of L-shaped link bar 212. The end of the long leg of the link bar 212 is mounted on one end of a pivot shaft 216 which extends through the support plate 213 and carries on its outer end a short arm 217 having a cam follower roller 218 at its free end which is received in the cam track 219 (FIGURES 5 to 8 and 22 to 24) on the inner or rearward face of a plate cam 220 fixed at the front side of the turret on the frame 185.

A bottom seal forming assembly 210 (FIGURES 1, 5, 6, 7, 12, 13 and 14) is supported on the outer end of each of six arms 221 which extend radially from a hub formation 222 rotatably mounted on the frame 185 at the back of the turret 35. The arms 221 are equally spaced and are driven so as to rotate with the shaft 155. Each of the seal forming assemblies 210 includes a carriage 223 (FIGURE 13) which is secured between a pair of parallel slide bars 224 and 224'. The slide bars 224 and 224' are received in guideway forming recesses 225 and 225' in spaced supporting blocks 226 and 226' fixed on the outer end of arm 221, the latter having an outer outwardly opening end recess 227 for accommodating lateral movement of the assembly 210. Each carriage 223 carries a cam follower roller 228 mounted on an outwardly extending bracket 230 and controlled by cam bars 231 and 231' extending in hoop-like arrangement about the periphery of the fixed supporting frame 232 at the back side of the machine, the supporting frame including a plurality of plate-like bars, some of which extend in a generally radial direction relative to the axis of the shaft 155 as shown in FIGURE 1. Sealing irons 233 and 233' having suitable electric heating elements are carried on the outer ends of pairs of spaced supporting arms 234, 235 and 236, 237. The arms 234, 235 and 236, 237 are mounted on pivot shafts 240 and 241 and the forward most arms 234 and 236 are provided with integral interengaging toothed segments 242 and 243 so that all of the arms move in unison. A torsion spring 244 is provided on the one pivot shaft 241 which operates to urge the arms in a direction to bring the sealing irons 233, 233' toward each other into sealing position or relation when the assembly is in extended position adjacent the end of the mandrel assembly 30. The one arm 237 has an upward extension 245 (FIGURE 13) with an angular portion 246 on which two cam follower rollers 247 and 248 are mounted. The extension 245 also has an integral projecting lug or arm 250 on which a cam follower roller 251 is mounted in position to engage with a cam track forming edge of a cam plate 252 secured on the one guide block 226 when the assembly 210 is retracted to non-operating position so that the sealing bars 233 and 233' are held in the open position as shown in FIGURE 13. The cam follower rollers 247 and 248 are adapted to engage with circumferentially spaced fixed cam bars 253 and 253' for opening or separating the sealing irons 233 and 233' after the sealing operations, the second or trailing follower roller 248 serving to allow the bars to snap closed at the end of the closing movement which is begun while the first or leading follower roller 247 is engaged with the cam bars. An anvil member 254 (FIGURE 12) which cooperates with the sealing bars 233 and 233' in effecting the seals across the triangular portions of the bag bottom formation is supported on the lower or inner end of a generally U-shaped frame 255 having its legs 256 and 256' slidably received in sleeve bearings 257 and 257' in the carriage member 223. The portion 258 of the frame 255 has an integral lug or boss 259 for mounting thereon a cam follower roller 260. The cam follower roller 260 is adapted to engage the fixed cam bar 261 (FIGURE 1) which is mounted by means of suitable brackets on the periphery of the supporting frame 232 at the back of the machine. A compression spring 262 is mounted on a center pin 263 on the anvil frame 255 with one end seated in a center recess 264 in the carriage member 223 which normally retracts the anvil 254. The anvil member 254 is projected downwardly or inwardly toward the mandrel assembly 30 to a predetermined position between the triangular bottom end portions formed on a bag section when the mandrel is opened up to square up the body of the bag so that when the sealing bars 233 and 233' are closed to seal these triangular portions and form the seams 15, 15' the triangular portions are engaged between the sealing bars 233 and 233' and the anvil member 254. The triangular portions at the ends of the bag bottom are moved into position for sealing by the sealing bars 233, 233' and the anvil member 254 by advancing movement of the mandrel plates under the control of the cam operated linkage heretofore described. As the turret advances a mandrel assembly 30 after the transverse end seal or seam 14 is completed thereon, the sealing bars 233 and 233' on the seal forming mechanism 210 are opened by the cam bar 253 to release the tube section and the plates of the mandrel assembly 30 are hinged on each other into a square tube formation which squares up the sealed bottom of the tube and results in projecting the triangular bottom end portions outwardly of the end of the mandrel assembly. The mandrel plates are then hinged so as to bring them into the flattened position of FIGURE 7. As the mandrel assembly 30 advances the triangular portions are brought toward each other and during this movement the anvil member 254 is projected inwardly between the two triangular portions as they approach each other while the sealing irons 233, 233' are moved towards the anvil member 254 to engage the two triangular portions and effect the cross seals 15, 15' which form the end edges of the bottom of the bag. While the sealing irons 233, 233' are closed, the mandrel moves to a mechanism 270 (FIGURES 1, 14 and 15) which is provided for removing the triangular shaped waste portions of the bag bottom which extend outwardly beyond the end edge seal or seams 15, 15'. The waste portions are pulled loose before the sealing irons are opened while the seam forming material is still in a softened state so as to permit separation of the triangular portions leaving the seams 15, 15' intact.

The waste removing mechanism 270 (FIGURES 1 and 15 to 18) is supported on a bracket 271 which extends upwardly of the base frame 26 and which has at its upper end an adjustably mounted supporting plate 272 in which a small shaft 273 is journaled by means of bearing forming member 274. The shaft 273 carries a pair of jaw forming clamp members 275 and 276 with the jaw 275 fixed on the shaft 273 so that it rotates therewith. The cooperating jaw 276 is connected to the tail end of the jaw 275 on the other side of the shaft 273 by the pivot 277 which also supports one end of a C-shaped cam follower arm 278. The other end of the cam follower arm 278 carries cam follower roller 280 which rides on the track forming edge of the plate cam 281 which is fixed on a hub-like portion 282 of the fixed bearing member 274 on the supporting plate 272. The shaft 273 carries a pulley 283 which is driven by the belt 284. The cam 281 is arranged relative to the shaft 273 and the rotation of the latter is timed so that the jaw members 275, 276 open, as the shaft 273 rotates, and close on the triangular waste portions of each successive bag which is advanced on a mandrel assembly 30, as indicated in dotted line in FIGURE 16. A waste disposal chute 285 is arranged with an open mouth 286 adjacent the bottom path of the jaws 275, 276 and connected to a fan 290 (FIGURE 1) for suction disposal of the waste portions. The fan 290 is driven by motor 291 mounted on the lower portion of an upright stand 292 at the end of the machine. Stand 292 is supported on a base 293 which also supports the frames 21 and 26. The drive belt 284 for the waste removal mechanism 270 is driven by a pulley 294 on a cross drive shaft 295 journaled in the upper portion of the stand 292 and carrying a pulley 296 which is connected by drive belt 297 with the output pulley 298 on a main drive power unit 300 at the base of the machine. The belt 284 also drives a pulley 301 on a cross drive shaft 302 which is rotatably supported in parallel bearing support brackets 303 and 303' extending from a cross frame angle member 304 mounted on the frame portion 185 at the bottom of the turret 35 and operates a stripping mechanism 305 for removing the finished bags from the mandrel assemblies 30.

The bag stripping mechanism 305 (FIGURES 1, 15 and 19 to 21) comprises a pair of laterally spaced endless chains 306 and 306' carried at one end on laterally spaced sprockets 307 and 307' mounted on the cross shaft 302. The chains 306 and 306' are carried at their other ends on small sprockets 308 and 308' mounted on a cross shaft 309 which is journaled in the frame structure 185 and which carries a small supporting frame 310 for a cross shaft 311 on which chain tensioning idler sprockets 312, 312' are mounted, the frame 310 being adjustable about the shaft 309 so as to maintain the desired tension in the chains 306 and 306' and being secured in adjusted position by the hanger bar 313 which is adjustably mounted on the side plate of the frame structure 185. The chains 306 and 306' carry a pair of gripper members 314 and 315 (FIGURES 19 to 21). The gripper member 314 has an elongate bar forming portion which is extended at its ends and secured to the chains 306 and 306' by means of mounting brackets 316 and 316' so that this member is fixed relative to the chains 306 and 306'. The gripper bar 315 which is in the form of an inverted U-shaped frame, as viewed in FIGURE 20, is pivotally supported on the bar 314 by connecting pivot pin 317. The movable gripper bar 315 has a cam arm 318 extending laterally from the one end thereof which carries a cam follower roller 320. The cam follower roller is adapted to engage on the track forming edge of a cam plate 321 mounted in fixed relation relative to the shaft 302. A torsion spring 322 on the pivot pin 317 tends to hold the clamp bars or jaw members 314 and 315 in closed relation with the cam follower 320 engaging the cam plate 321 to open the jaw members 314 and 315 for gripping the extended bottom end portions of the bag on the mandrel 30 as the latter moves in its path above the sprockets 307 and 307'. The face of the one clamp bar 314 has a small insert 323 of rubber or similar material and the clamp bar faces have a complementary taper so that the extended portion of the bag is gripped evenly when the mandrel plates are not completely closed. The end of the bag is held between the gripper bars 314 and 315 until the gripper bars reach the bottom of the sprockets 307 and 307' when the cam follower 320 engages the cam plate 321 and opens the gripper bars 314 and 315 to release the bag for deposit on a discharge conveyor 325.

The discharge conveyor 325 comprises an endless belt 326 supported at one end on the roller 327 which is journaled in an upright bracket 328 and at the other end on a roller 330 which is supported on an upstanding bracket 331. The cross shaft 330 carries a sprocket 332 which is connected by a chain 333 with a sprocket 334 on an intermediate shaft 335 and the latter has a sprocket 336 which is connected by a drive chain 337 with the output sprocket 338 on a motor drive unit 340 also carried on the supporting frame 331 so that the delivery belt 326 is driven independently of the rest of the machine.

The motor unit 300 constitutes the main drive for the machine. It has an output sprocket 341 which is connected by a drive chain 342 with a sprocket 343 on a right angle gear assembly 344 at one end of an elongate drive shaft assembly 345 extending longitudinally on the floor of the machine to a right angle gear box 346 from which the vertical shaft 347 for driving the tube forming and cutting mechanism extends. The drive shaft 345 is extended to drive a further right angle gear box 348 which is connected to the drive shaft 152 for driving the mechanism for forwarding the tube sections L to the mandrel assemblies 30.

The drive for the turret 35 comprises a sprocket 350 on the forward end of the main shaft 155 which is connected by drive chain 357 with a sprocket 352 on a drive shaft 353 extending transversely of the machine and journaled in the upstanding support frame 292. The shaft 353 carries a gear 354 which engages with a pinion 355 on the drive shaft 295, the latter being driven by the main motor unit 300 as described above. The rotatably mounted supporting frame structure for the seal forming mechanism 210 which includes the arms 221 and the hub formation 222 is driven at the same speed as the main shaft 155. A sprocket 356 (FIGURES 6 and 7) is secured on the hub formation 222 and connected by chain 357 with a sprocket 358 (FIGURE 15) on the cross drive shaft 353 which also has a driving connection with the main turret shaft 155.

In operating the machine the web W of heat sealable film material of the proper size is guided to the tube forming mandrel plate 31 (FIGURES 1, 2 and 25) with its side margins M and M' overlapped so as to receive a line of adhesive from the applicator tube 44 and form the longitudinal seal or seam 13. The web is advanced by the cooperating draw rolls 45, 45' and 46, 46' and the tube T is cut into sections or lengths, according to the size bag desired, by the cutting knives 51 and 56, 56' and the cut sections L are advanced on the leading end of the mandrel plate 31 for delivery to a mandrel assembly 30 on the turret 35. The turret shaft 155 rotates continuously with a uniform speed. The mandrel assemblies 30 are carried on the support arms 166 (FIGURES 5, 6 and 7) which are in turn carried on the shaft 155 with their rotative movement controlled by plate cam 220 and barrel cam 195 through the linkage 211, 212 and 217 so that each mandrel assembly 30 is brought to a stop in horizontal alignment with the leading end of the tube forming plate 31 for a sufficient length of time to receive thereon a cut length L of the tubing. A positive feed device (FIGURES 3 and 4) is provided for delivering successive lengths L of the tubing to the mandrel assemblies 30. The fingers 100 and 100' are reciprocated longitudinally and laterally to engage inside the leading end of each tube length L and carry the same forward into telescoping relation on the mandrel assembly 30. When a tube length L has been deposited on the mandrel assembly 30 by the fingers 100, 100' and the latter have retracted to pick up the next tube length, the mandrel assembly 30 is advanced by the operation of the cams 195 and 220 to bring the assembly into alignment with a sealing mechanism 210 which is carried on the turret subframe 221, 222 of the turret 35 and rotated at the same speed as the main shaft 155. The sealing mechanism 210 is moved in by cam bars 231, 231' with the heated sealing bars or irons 233 and 233' held open until the mechanism is in position at the end of the mandrel assembly 30 for the sealing irons to close on the end portion of the length of tubing L which projects from the mandrel assembly 30 so as to form the transverse end seal 14 (FIGURE 27). The sealing irons or jaws 233, 233' are then opened and the sealing mechanism 210 is retracted. As the mandrel assembly 30 advances the plates 158, 159, 160 and 161 are hinged or opened up into tube formation to form the body of the tube length L into tubular shape which causes the sealed end portion to fold into a transverse plane at the outer or free end of the mandrel assembly 30, with triangular portions projecting radially relatively to the axis of rotation of the turret 35 and in oppositely disposed relation. The sealing mechanism 210 is then moved into sealing position at the end of the mandrel assembly 30 with the anvil member 254 (FIGURES 12 and 13) moved inwardly toward the mandrel assembly and between the triangular portions. As the mandrel assembly 30 and the sealing mechanism 210 advance the mandrel plates 158, 159, 160 and 161 are collapsed or hinged in the opposite direction which flattens the tube section and brings the triangular portions toward each other on opposite sides of the anvil member 254 while the sealing irons 233 and 233' are closed against the anvil member 254 to effect the seals 15 and 15' (FIGURES 26 and 27). While the sealing irons 233 and 233' are closed the waste portions outside of the seals 15 and 15' are engaged by the gripping jaws 275 and 276 (FIGURE 16) of the waste removal device 270 and pulled loose for disposal through the waste discharge chute 285. The sealing irons 233 and 233' are opend and the sealing mechanism 210 is retracted while the mandrel assembly 30 is advanced to the bag stripping or delivery mechanism 305 at the bottom of the turret 35. The gripper bars 314 and 315 (FIGURES 15, 19, 20 and 21) grasp the end portions of the finished bag 10 which project from the collapsed mandrel assembly 30, strip the same from the assembly 30 and deposit it on the delivery conveyor 325. The plates 158, 159, 160 and 161 of the mandrel assembly 30 are hinged in the reverse direction to their initial position as the assembly 30 is advanced and stopped to receive another tube length L from the plate mandrel 31, and the cycle of operations is repeated.

While particular materials and specific details of construction are referred to in describing the embodiment of the invention which is illustrated it will be understood that other materials and different structural details may be resorted to within the spirit of the invention.

I claim:

1. A machine for fabricating bags from heat sealable material in flattened tube form, comprising a turret supported on a shaft which is disposed generally horizontally, means to rotate the shaft, mandrel supporting arms mounted on said shaft and extending radially of the axis of rotation of said shaft, plate mandrel assemblies supported on said arms which plate mandrel assemblies extend in a radial direction and are adapted to collapse into flattened condition for receiving thereon a bag forming section of tubing and to subsequently open up into a tube formation so as to square up the section of tubing, heat sealing assemblies mounted on said turret for movement in a direction generally parallel with the axis of rotation of said shaft, each of said heat sealing assemblies including cooperating pivotally connected heat sealing members, cam means for moving the heat sealing assemblies into heat sealing position adjacent the outermost ends of said mandrel assemblies and means for operating the heat sealing assemblies so as to seal radially projecting portions of the sections of tubing.

2. A bag fabricating machine comprising a turret supported on a generally horizontal rotatable shaft, means to rotate the shaft, mandrel supporting arms mounted on said shaft and extending radially of the axis of rotation of said shaft, plate mandrel assemblies supported on said arms which plate mandrel assemblies are adapted to collapse into flattened condition for receiving thereon a length of heat sealable bag forming tubing and to subsequently open up so as to square up the length of tubing, heat sealing devices mounted on said turret for movement in a lateral direction, each of said heat sealing devices including cooperating pivotally connected heat sealing jaw members, cam means for moving the heat sealing devices into operative position adjacent the free ends of said mandrel assemblies, and cam means for opening and closing the heat sealing jaws so as to engage projecting end portions of each length of tubing and to seal bottom forming portions of each said length of tubing.

3. A machine for fabricating bags from heat sealable tubular material comprising a turret rotatably supported for movement about a generally horizontal axis, means to rotate the turret, mandrel supporting arms mounted on said turret and extending radially of the axis of rotation, plate mandrel assemblies supported on said arms in radially extending position, which plate mandrel assemblies are adapted to collapse into flattened condition for receiving thereon a bag forming section of said tubular material and to subsequently open up to square up the tubular section, heat sealing assemblies mounted on supporting arms on said turret and movable thereon into operative position at the outermost end of each mandrel assembly, each of said heat sealing assemblies including a pair of cooperating movably connected heat sealing jaw members, means for moving the heat sealing assemblies into operative position and means for closing the heat sealing jaw members on end portions of the tubular sections which project beyond the ends of the supporting mandrels so as to seal bottom forming portions of each tubular section.

4. A machine for fabricating bags from heat sealable film material in tubular form, comprising a turret supported for rotation on a generally horizontal axis, means to rotate the turret, mandrel supporting arms mounted on said turret and extending radially of said horizontal axis, plate mandrel assemblies supported on the outermost ends of said arms which plate mandrel assemblies are hinged so as to collapse into flattened condition for receiving thereon a bag forming section of tubing and to subsequently open up so as to square up the section of tubing, heat sealing assemblies mounted on the outer periphery of said turret and slidable in a direction toward the outermost ends of said mandrel assemblies, each of said heat sealing assemblies including cooperating hingedly connected heat sealing jaw members, means for sliding the heat sealing assemblies into operative position adjacent the ends of said mandrel assemblies, means for closing the heat sealing jaw members on projecting end portions of the bag forming tubular sections so as to form a transverse seal and thereafter opening the jaw members, means for hinging the mandrels so as to square up the bottom forming portion of each tubular section and form thereon oppositely disposed triangular shaped portions which project at the outermost end of each mandrel assembly, means for reclosing the heat sealing jaw members on said triangular shaped portions to seal across the same and means for removing the waste forming sections of said triangular portions which extend beyond the sealed portions thereof.

5. A bag fabricating machine comprising a turret rotatably supported on a horizontally disposed shaft, means to rotate the shaft, mandrel supporting arms mounted on said shaft and extending radially of the axis of rotation of said shaft, plate mandrel assemblies supported on said arms which plate mandrel assemblies are adapted to collapse into flattened condition for receiving thereon a bag forming section of heat sealable tubing and to subsequently open up so as to square up the section of tubing, heat sealing assemblies mounted on said turret for movement thereon in a direction generally parallel with the axis of rotation of said shaft and into sealing position at the ends of the mandrels, each of said heat sealing assemblies including cooperating pivotally connected heated jaw members and cam means for closing the heat sealing jaw members on the projecting ends of tubing on said mandrels so as to seal bottom forming portions of the bag forming sections of tubing.

6. A machine for fabricating bags from lengths of tubular bag forming material which comprises a turret mounted for rotation on a horizontally disposed shaft, means for rotating the shaft continuously at a uniform speed, a plurality of radially extending mandrel supporting arms mounted on said shaft for movement relative to the shaft about the axis of rotation thereof, plate mandrel assemblies supported on each of said arms, cam controlled means for holding said arms in peripherally spaced relation and for bringing each successive arm to a temporary stop at a predetermined point in the rotative path of said shaft while said shaft continues to rotate and means for delivering a length of bag forming material to each successive mandrel assembly during the temporary stop of the mandrel support arm.

7. A machine for fabricating bags from sections of tubular bag forming material which comprises a wheel-like turret mounted for rotation on a horizontally disposed shaft, a plurality of radially extending mandrel supporting arms mounted in spoke forming array on said shaft and movable to vary the position thereof relative to the axis of rotation of said shaft, plate mandrel assemblies carried on each of said arms, means including a linkage connecting each arm with said shaft so that the arm normally rotates with the shaft, means for bringing each successive arm to a temporary stop at a loading station while said shaft continues to rotate, and means to deliver to each successive mandrel assembly while it is stopped at the loading station a section of tubular bag forming material.

8. A machine for fabricating bags from tubular sections of bag forming material which comprises a turret mounted for rotation on a horizontally disposed shaft, means for rotating the shaft with a continuous uniform speed, a plurality of radially extending mandrel supporting arms mounted on said shaft and movable to vary the position thereof about the axis of rotation of said shaft, plate mandrel assemblies carried on each of said arms, means including a connecting linkage for holding said arms peripherally spaced about the axis of rotation of said shaft and means for bringing each successive arm to a temporary stop at a loading station while said shaft continues to rotate so as to receive a tubular section of bag forming material on the mandrel assembly carried thereon.

9. Apparatus for forming bags from heat sealable plastic film material comprising means for holding a continuous web of the film material into a tube with the side margins of the film overlapped and formed into a longitudinal seam, means for transversely severing the tube at longitudinally spaced intervals, a plurality of expansible plate mandrels mounted in radially extending relation on a continuously rotating support and movable about the axis of rotation of said support, means for bringing successive mandrels to a temporary stop at a delivery station adjacent the tube severing means for receiving a cut tube section while said support continues to rotate, means for feeding successive cut tube sections to successive mandrels at said delivery station, said delivery means including means for telescoping each successive tube section over a mandrel while the mandrel is collapsed, means associated with the mandrels to transversely seal the end of the tube section at the outermost end of the mandrel, means to open up each successive mandrel so as to square up the bag forming tube section with the closed end of the bag section folding into a flat plane at the outermost end of the mandrel and providing generally triangular end portions which project on opposite sides at the end of the mandrel, means associated with the turret for sealing across said triangular end portions along the end edges of the mandrel, and means associated with the turret for severing said triangular end portions so as to remove the waste portion thereof which extends outwardly beyond the edge seals.

10. Apparatus for forming bags from plastic film material comprising means for folding a continuous web of the film material into a tube, means for longitudinally sealing the tube, means for severing the tube at intervals to provide a plurality of bag forming sections, an expansible plate mandrel mounted on a rotating support, means for feeding a bag forming section to the mandrel, means for transversely sealing the bag section at the outermost end of said mandrel, means for expanding the mandrel to square up the bag section with the closed end thereof folding flat against the outermost end of the mandrel and forming generally triangular end portions projecting on opposite sides at the end of the mandrel, and means for sealing and severing the triangular end portions along the edges of the mandrel.

11. Apparatus for forming bags from heat sealable plastic film material comprising means for forming a continuous web of the film material into a tube, means for sealing overlapping edge portions of the web to form a longitudinal seam, means for transversely severing the tube at longitudinally spaced intervals to form a plurality of bag sections, a plurality of collapsible plate mandrels mounted in spaced relation on a rotating support, means for bringing each successive mandrel to a temporary stop at a position adjacent said tube severing means for receiving a bag section, means for feeding a bag section to each successive mandrel and for telescoping the bag section over the mandrel while the mandrel is stopped, means for sealing the end of the bag section at the outermost end of each successive mandrel, means for opening up each successive mandrel to square up the bag section thereon and to bring the sealed end of the bag section into a flat plane at the free end of the mandrel with generally triangular end portions projecting on opposite sides at the outermost end of the mandrel, heat sealing means associated with the turret for sealing across said triangular end portions along the outermost end edges of the mandrel, and means associated with the turret for separating said triangular end portions on a line outside the seals therein and for removing the waste portion thereof which extends outwardly beyond said seals.

12. In an apparatus for fabricating a bag from a tubular section which is formed of heat sealable material, mechanism for sealing one end thereof while the section is in flattened condition, mechanism for squaring up the flattened tubular section and flattening the portion thereof adjacent the sealed end into a plane which extends transversely of the long axis of the tubular section, which mechanism comprises a rotatably mounted turret having a series of radially projecting arms spaced about the periphery thereof, a mandrel assembly on each arm which comprises a plate member fixed on the arm and cooperating plates hinged to the fixed plate member which are foldable from a flattened condition into a tubular condition in the opposite direction, and cam controlled means associated with each arm and the associated mandrel assembly causing the plates to unfold into tubular condition and to refold into flattened condition while they are carried by the turret in a circular path.

13. In an apparatus for fabricating a bag from a flattened tubular section which is formed of plastic sheet material and which has one end thereof closed, a turret having a series of expansible plate mandrels spaced about the periphery thereof for squaring up the flattened tubular section and causing the portion thereof adjacent the closed end to fold into a plane which extends transversely of the long axis of the tubular section, each of said plate mandrels comprising a supporting arm with a rectangular plate member fixed on the end thereof and three cooperating rectangular plate members hinged to the first plate, means including a lever arm connected to said supporting arm and said plates, cam means for moving said lever arm so as to swing said plates between an open and collapsed position, and means associated with the turret for heat sealing folded portions of the bag section at the free ends of the mandrels while said mandrels are in the open position and for removing waste portions outside of the heat seals.

14. A machine for fabricating bags from heat sealable material in flattened tube form, comprising a turret supported on a shaft which is disposed generally horizontally, means to rotate the shaft, plate mandrel assemblies supported on said shaft which plate mandrel assemblies extend in a radial direction and have hingedly connected members adapted to collapse into flattened condition for receiving thereon a bag forming section of tubing and to subsequently open up into a tube formation so as to square up the section of tubing, heat sealing assemblies mounted on said turret for movement in a direction generally parallel with the axis of rotation of said shaft, each of said heat sealing assemblies including cooperating pivotally connected heat sealing bar members, means for moving the heat sealing assemblies into seal forming position adjacent the outermost ends of said mandrel assemblies and means for pivoting said heat sealing members so as to engage the tubing on said mandrels and form seals therein.

15. A machine for fabricating bags from heat sealable tubular material comprising a turret rotatably supported for movement about a generally horizontal axis, means to rotate the turret, mandrel supporting arms mounted on said turret and extending radially of the axis of rotation, plate mandrel assemblies supported on said arms in radially extending position, which plate mandrel assemblies include hingedly connected plates adapted to collapse into flattened condition for receiving thereon a bag forming section of said tubular material and to subsequently hinge to an open position and square up the tubular section, heat sealing assemblies mounted at the ends of supporting arms on a frame on said turret and movable thereon in a direction to position the same at the outermost end of each mandrel assembly, each of said heat sealing assemblies including a pair of cooperating movably connected heat sealing jaw members, means for rotating the supporting frame for the heat sealing assemblies in the same direction as the turret, means to move the heat sealing assemblies adjacent the ends of the mandrel assemblies and means for closing the heat sealing jaw members on end portions of the tubular sections which project beyond the ends of the supporting mandrels so as to seal bottom forming portions of each tubular section.

16. A machine for fabricating bags from heat sealable film material in tubular form, comprising a turret supported for rotation on a generally horizontal axis, means to rotate the turret, mandrel supporting arms mounted on said turret and extending radially of said horizontal axis, plate mandrel assemblies supported on the outermost ends of said arms which plate mandrel assemblies include hingedly connected plates adapted to collapse into flattened condition for receiving thereon a bag forming section of tubing and to subsequently hinge to a tubular condition so as to square up the section of tubing, heat sealing assemblies mounted on the outer periphery of said turret and slidable in a direction to position the same at the outermost ends of said mandrel assemblies, each of said heat sealing assemblies including cooperating hingedly connected heat sealing jaw members, means for sliding the heat sealing assemblies into operative position adjacent the ends of said mandrel assemblies, spring means for closing the heat sealing jaw members on projecting end portions of the bag forming tubular sections so as to form a transverse seal and cam means for thereafter opening the jaw members, means for hinging the mandrel plates so as to square up the bottom forming portion of each tubular section, which results in oppositely disposed triangular shaped portions projecting at the outermost end of each mandrel assembly, means for moving the heat sealing assemblies into sealing position at the ends of the mandrels, means for closing the heat sealing jaw members on said triangular shaped portions to seal across the same and means for grasping the waste forming sections of said triangular portions which extend beyond the sealed portions thereof and pulling the same free of the sealed areas engaged by said sealing jaw members.

17. A machine for fabricating bags from lengths of tubular bag forming material which comprises a turret mounted for rotation on a horizontally disposed shaft, means for rotating the shaft continuously at a uniform speed, a plurality of radially extending mandrel supports mounted on said shaft for rotative movement relative to said shaft and about the axis of rotation of said shaft, plate mandrel assemblies supported on each of said supports, means for holding successive supports in predetermined peripherally spaced relation on said shaft and means for bringing each successive support to a temporary stop at a loading station and means at the loading station for delivering a length of bag forming material to each successive mandrel assembly during the temporary stop of the mandrel support at said station.

18. A machine for fabricating bags from sections of tubular bag forming material which comprises a wheel-like turret mounted for rotation on a horizontally disposed shaft, means for rotating said shaft continuously, a plurality of radially extending mandrel supporting arms rotatably mounted in spoke forming array on said shaft, mandrel assemblies carried on each of said arms, a linkage connecting each arm with said shaft, means for moving the linkage so that the arm is rotated with the shaft for a predetermined portion of each rotation of the shaft and during the remainder of each rotation of the shaft the arm is brought to a temporary stop at a loading station while said shaft continues to rotate, and means to deliver to each successive mandrel assembly while it is stopped at the loading station a section of tubular bag forming material.

19. A machine for fabricating bags from tubular sections of bag forming material which comprises a wheel-like turret mounted for rotation on a horizontally disposed shaft, means for rotating the shaft with a continuous uniform speed, a plurality of mandrel supporting arms rotatably mounted on said shaft in radially extending spoke-like array and movable to vary the position thereof about the axis of rotation of said shaft, plate mandrel assemblies carried on each of said arms, a linkage pivotally connected at one end to a member which is fixed on said shaft and at the other end to each of said arms, cam means for controlling said linkage to vary the position of each arm on said shaft whereby to hold said arms at a predetermined position on said shaft while the shaft continues to rotate and to move each of said arms on said shaft during a predetermined portion of each rotation thereof so as to bring each arm to a temporary stop while said shaft continues to rotate for receiving a tubular section of bag forming material on the mandrel assembly carried thereon.

20. In an apparatus for fabricating bags from film material, a relatively flat, generally rectangular forming plate, means for folding a continuous web of film material around said plate with the margins of the web overlapped, means to form a longitudinal seam in said overlapped margins so as to provide a continuous tube, means to transversely sever the tube at longitudinal spaced intervals whereby to provide successive bag forming lengths of the tubing, and means to feed the web and the tube along the forming plate, which means comprises spaced pairs of driven feed rolls with one pair of said feed rolls adjacent the leading end of said forming plate, one of said last mentioned pair of feed rolls being mounted for movement toward and from the other feed roll of said pair thereof, and means to move said feed roll intermittently so as to release the trailing ends of leading sections of said cut tubing for advance beyond said forming plate.

21. In an apparatus for fabricating a bag from a tubular section which is formed of heat sealable material, mechanism for sealing one end thereof while the section is in flattened condition, mechanism for squaring up the flattened tubular section and flattening the portion thereof adjacent the sealed end into a plane which extends transversely of the long axis of the tubular section, which mechanism comprises a rotatably mounted turret having a series of radially projecting support arms spaced about the periphery thereof, a mandrel assembly on each arm which comprises a rectangular plate member fixed at one end on the end of a support arm and cooperating rectangular plate members hinged to the fixed plate member along adjacent edges so as to hinge from a flattened condition into a tubular condition and then into a flattened condition with the movable plates extending in the opposite direction relative to the fixed plate, and cam controlled means associated with each arm and the associated mandrel assembly for causing the plates to hinge into tubular condition and into flattened condition while they are carried by the turret in a circular path.

22. In an apparatus as recited in claim 21 and said cam controlled means comprising a pivot member journaled on said support arm and connected to a mandrel plate member which is hinged to the fixed plate member, a gear segment secured on said pivot and in toothed engagement with a gear mounted on a shaft journaled in said support arm and carrying a cam lever, a cam follower member on said cam lever and means forming a fixed cam track for engaging said cam roller as the support arm is rotated.

23. In an apparatus as recited in claim 22 and means on said mandrel assembly for limiting the movement of said plate members relative to each other.

24. Apparatus for forming bags from heat sealable plastic film material comprising means for delivering a continuous tube formed of the film material with overlapping edge portions sealed to form a longitudinal seam and with the tube severed at longitudinally spaced intervals into a plurality of bag forming sections, a plurality of collapsible mandrels mounted in spaced relation on a rotating support, means for bringing each successive mandrel to a position for receiving a bag section, means for feeding a bag forming tube section to each successive mandrel and for telescoping the bag forming tube section over the mandrel in substantially flat condition, means for sealing the end of the bag forming tube section at the outermost end of each successive mandrel so as to form a transverse end seam, means for opening up each successive mandrel to square up the bag forming tube section thereon and to bring the sealed end thereof into a flat plane at the free end of the mandrel resulting in generally triangular end portions projecting on opposite sides at the outermost end of the mandrel, said sealing means being operable for engaging and sealing across said triangular end portions along opposite end edges of the mandrel, and means associated with the turret for separating from the body of the bag thus formed the waste forming sections of said triangular end portions which lie outside the seals therein and for removing said waste forming sections.

25. Apparatus as recited in claim 24 and said means for separating the waste forming sections of said triangular end portions comprising a rotating spindle mounted adjacent the path of rotation of the outermost ends of said mandrels, gripper jaws on said spindle and associated means for opening and closing said gripper jaws so as to grasp said waste forming sections and pull the same free while the triangular portions are engaged by said sealing means.

26. Apparatus as recited in claim 25 and suction means including a discharge chute for disposing of said waste sections when said gripper jaws are opened and said waste sections are released therefrom.

27. Apparatus as recited in claim 24 and said means for separating the waste forming sections of said triangular end portions comprising rotatably mounted gripper jaws with operating means to grasp the waste sections and pull the same free for disposal through a suction tube.

28. Apparatus for forming bags from plastic film material comprising means for folding a continuous web of the film material into a tube with the side margins overlapped, means for longitudinally sealing the overlapped side margins to form a continuous tube, means for severing the tube at intervals to provide a plurality of bag forming tube lengths, an expansible mandrel mounted on a rotating support, means for telescoping over the mandrel a bag forming tube length, means for transversely sealing the bag forming tube length at the outermost end of said mandrel, means for expanding the mandrel to square up the bag section with the sealed end thereof folding flat against the outermost end of the mandrel and forming generally triangular end portions which project outwardly along opposite sides at the end of the mandrel, and means for sealing and severing the triangular end portions along the edges of the mandrel.

29. Apparatus for forming bags as recited in claim 28 and means for telescoping the bag forming length over the mandrel comprising a pair of fingers mounted on reciprocably mounted supports having means for moving the same to engage inside the leading end of successive bag forming tube lengths and to advance the bag lengths over the mandrel.

30. In a bag fabricating machine which has a rotatably supported turret mounted on a horizontally disposed shaft with means to rotate the shaft and mandrel supporting arms mounted in spoke-like arrangement on said shaft with plate mandrel assemblies supported thereon which are adapted to collapse into flattened condition for receiving a bag forming section of heat sealable tubing and to subsequently open up so as to square up the section of tubing, heat sealing assemblies mounted for travel with said turret and movable in a direction generally parallel with the axis of rotation of said shaft to an extended seal forming position adjacent the ends of said mandrel assemblies, each of said heat sealing assemblies including a pair of cooperating pivotally connected heat sealing bars with spring means normally urging said heat sealing bars toward each other, means including a cam track extending about said turret for moving said heat sealing assemblies into and out of seal forming position, cam means for controlling the closing movement of said sealing bars when said heat sealing assemblies are in seal forming position, and cam means for holding the heat sealing bars in open position when said heat sealing assemblies are in retracted non-seal forming position.

31. In a bag fabricating machine as recited in claim 30 and said heat sealing assemblies including an anvil bar mounted for movement into and out of cooperating relation with said sealing bars.

32. In a bag fabricating machine as recited in claim 31 and means including a fixed cam at a predetermined point around said turret for moving said anvil bar into and out of cooperating relation with said sealing bars.

33. In a bag fabricating machine comprising a rotating turret supported on a generally horizontal shaft, mandrel assemblies mounted on said turret and extending radially of the axis of rotation thereof which mandrel assemblies are adapted to collapse into flattened condition for receiving thereon a length of bag forming tubing and to subsequently open up so as to square up the length of tubing for bottom forming operations thereon after which the mandrel assemblies are collapsed for removal of the completed bag, a bag stripping apparatus comprising an endless conveyor having a pair of cooperating gripper jaws thereon which are operable to grip the sealed bottom forming end of the finished bag on each successive mandrel while the mandrel is collapsed and to strip the bag from the mandrel for delivery to a discharge conveyor.

References Cited
UNITED STATES PATENTS

| | | | |
|---|---|---|---|
| 2,837,983 | 6/1958 | Kovac | 93—44.1 |
| 3,150,573 | 9/1964 | Piazze | 93—35 |
| 3,153,374 | 10/1964 | Borkmann et al. | 93—44.1 |

ROBERT C. RIORDON, *Primary Examiner.*

FRANK E. BAILEY, *Examiner.*

R. ALVEY, *Assistant Examiner.*